United States Patent
Nemoto et al.

(10) Patent No.: US 8,077,867 B2
(45) Date of Patent: Dec. 13, 2011

(54) CONFIDENTIAL INFORMATION PROCESSING APPARATUS, CONFIDENTIAL INFORMATION PROCESSING DEVICE, AND CONFIDENTIAL INFORMATION PROCESSING METHOD

(75) Inventors: Yusuke Nemoto, Hyogo (JP); Yuishi Torisaki, Hyogo (JP); Makoto Fujiwara, Kyoto (JP); Satoru Kuriki, Aichi (JP); Masahiro Sano, Aichi (JP)

(73) Assignee: Panasonic Corporation, Osaka (JP)

( * ) Notice: Subject to any disclaimer, the term of this patent is extended or adjusted under 35 U.S.C. 154(b) by 1010 days.

(21) Appl. No.: 11/970,796

(22) Filed: Jan. 8, 2008

(65) Prior Publication Data

US 2008/0170686 A1 Jul. 17, 2008

(30) Foreign Application Priority Data

Jan. 15, 2007 (JP) ................................. 2007-005638
Aug. 30, 2007 (JP) ................................. 2007-224262

(51) Int. Cl.
*H04L 9/00* (2006.01)

(52) U.S. Cl. ............ 380/42; 380/30; 380/255; 380/259; 380/277; 713/158; 713/175; 713/182; 713/187; 713/189; 726/27

(58) Field of Classification Search .................... 380/42, 380/30, 255, 259, 277–285; 713/158, 175, 713/189, 182, 187; 726/27
See application file for complete search history.

(56) References Cited

U.S. PATENT DOCUMENTS

| | | | | |
|---|---|---|---|---|
| 4,255,811 A | * | 3/1981 | Adler | ............................. 380/37 |
| 6,023,507 A | * | 2/2000 | Wookey | ........................ 709/224 |
| 7,822,201 B2 | * | 10/2010 | Shamoon et al. | ............. 380/201 |
| 2005/0071653 A1 | * | 3/2005 | de Jong | ........................ 713/189 |
| 2005/0152378 A1 | * | 7/2005 | Bango et al. | ................... 370/400 |
| 2005/0195975 A1 | * | 9/2005 | Kawakita | ......................... 380/30 |
| 2006/0136723 A1 | | 6/2006 | Taylor | |
| 2007/0015589 A1 | | 1/2007 | Shimizu et al. | |
| 2007/0150750 A1 | * | 6/2007 | Kokubun | ...................... 713/189 |

(Continued)

FOREIGN PATENT DOCUMENTS

JP 2006-41684 2/2006

OTHER PUBLICATIONS

English language Abstract of JP 2006-41684.

(Continued)

*Primary Examiner* — Thu Ha Nguyen
(74) *Attorney, Agent, or Firm* — Greenblum & Bernstein, P.L.C.

(57) ABSTRACT

The present invention relates to a confidential information processing device, a confidential information processing apparatus, and a confidential information processing method, and particularly to a confidential information processing device which performs multiple cryptographic computation for different target data included in a data stream. With this configuration, the context control unit outputs the stream on which the cryptographic computation is performed to an external device or other stream analysis unit. Thus, by setting the number of cryptographic computation on a correspondence table, the number of computation can be set to any number. Thus, the confidential information processing device according to the present invention can perform any number of cryptographic computations on one stream. Furthermore, without outputting the stream whenever a cryptographic computation is completed, multiple cryptographic computations can be performed with one stream input. In addition, by setting the number of cryptographic computation on the correspondence table, the number of computation can be easily changed.

18 Claims, 14 Drawing Sheets

U.S. PATENT DOCUMENTS

| | | | | |
|---|---|---|---|---|
| 2008/0010452 | A1* | 1/2008 | Holtzman et al. | 713/158 |
| 2008/0010458 | A1* | 1/2008 | Holtzman et al. | 713/175 |
| 2008/0106685 | A1* | 1/2008 | Holtzman et al. | 726/27 |
| 2009/0106551 | A1* | 4/2009 | Boren et al. | 713/158 |
| 2009/0245515 | A1* | 10/2009 | Bond et al. | 380/255 |
| 2010/0080387 | A1* | 4/2010 | Fan et al. | 380/259 |

OTHER PUBLICATIONS

U.S. Appl. No. 11/912,422 to Shimizu et al., which was filed on Oct. 24, 2007.

* cited by examiner

| Stream ID | 0 | 1 | 2 | 3 | 4 | 5 | 6 | |
|---|---|---|---|---|---|---|---|---|
| Context ID (First stage) | 0 | 1 | 2 | 4 | 6 | 8 | 10 | ... |
| Context ID (Second stage) | — | — | 3 | 5 | 7 | 9 | — | |

| Context ID | 0 | 1 | 2 | 3 | 4 | 5 | 6 | 7 | 8 | 9 | 10 |
|---|---|---|---|---|---|---|---|---|---|---|---|
| Algorithm | AES | SHA1 | SHA1 | AES | AES | SHA1 | AES | AES | SHA1 | DES | SHA1 |
| Mode | CBC decryption | HMAC | HMAC | CBC encryption | CBC decryption | HMAC | CBC decryption | CBC encryption | HMAC | CBC encryption | HMAC |
| Header length | 7 | 5 | 4 | 32 | 32 | 4 | 0 | 0 | 20 | 0 | 32 |
| Payload length | 240 | 251 | 196 | 224 | 224 | 196 | 128 | 128 | 200 | 128 | 128 |
| Footer length | 9 | 0 | 56 | 0 | 0 | 56 | 0 | 0 | 36 | 128 | 96 |
| Fraction output flag | ON | OFF | OFF | OFF | OFF | OFF | OFF | OFF | OFF | OFF | OFF |
| Number of successive payload | 1 | 1 | 1 | 1 | 1 | 1 | 1 | 1 | 1 | 1 | 2 |
| Stream non-output flag | OFF | ON | OFF | OFF | OFF | OFF | OFF | OFF | OFF | OFF | ON |
| Hash value replacement position | 0 | 0 | 201 | 0 | 0 | 0 | 0 | 0 | 221 | 0 | 0 |
| Hash value comparison position | 0 | 0 | 0 | 0 | 0 | 201 | 0 | 0 | 0 | 0 | 0 |
| Key/Initial value | ... | ... | ... | ... | ... | ... | ... | ... | ... | ... | ... |
| Intermediate information | ... | ... | ... | ... | ... | ... | ... | ... | ... | ... | ... |
| Hash value | ... | ... | ... | ... | ... | ... | ... | ... | ... | ... | ... |

213

CONFIDENTIAL INFORMATION PROCESSING APPARATUS, CONFIDENTIAL INFORMATION PROCESSING DEVICE, AND CONFIDENTIAL INFORMATION PROCESSING METHOD

BACKGROUND OF THE INVENTION (1) Field of the Invention

The present invention relates to a confidential information processing device, a confidential information processing apparatus, and a confidential information processing method, and particularly to a confidential information processing device which performs multiple cryptographic computation for different target data included in a data stream.

(2) Description of the Related Art

In apparatuses such as a digital television, a DVD recorder and a mobile phone, operations for secret-key cryptography or hashing operation (hereinafter simply referred to as "cryptographic computation", and "cryptographic computation refers to at least either decoding of encrypted data or encrypting plain text data) is performed for a received data stream or a data stream to be transmitted (hereinafter simply referred to as "stream") in order to enhance security. More specifically, apparatuses such as a digital television, a DVD recorder, and a mobile phone include a confidential information processing device which performs cryptographic computation for a stream.

The cryptographic computation performed by the confidential information processing device are classified into the cases where the cryptographic computation for the whole stream is performed using the same algorithm, where a cryptographic computation is performed for a predetermined area of data included in the stream, and where multiple cryptographic computations are performed for different areas of data included in the stream. For example, the confidential information processing device first performs secret key cryptographic computation for the first area of the data included in a stream, and performs a hash computation for the second area of the data included in the stream. More specifically, the confidential information processing device may perform multiple cryptographic computations of which computation methods are non-unique.

Note that, a data area, the number of cryptographic computation, and the cryptographic algorithm used for cryptographic computation is specified by IPSec (Security Architecture for Internet Protocol) or Digital broadcast standard and the like.

For example, a confidential information processing device which performs multiple cryptographic computations using non-unique computation methods is disclosed in Japanese Unexamined Patent Application Publication No. 2006-41684.

The conventional confidential information processing device disclosed in Japanese Unexamined Patent Application Publication No. 2006-41684 is capable of performing authentication and encryption in parallel for one stream.

However, in the conventional confidential information processing device disclosed in Japanese Unexamined Patent Application Publication No. 2006-41684, when the computation methods are non-unique for the entire stream, it is necessary to perform a cryptographic computation for the whole stream by dividing the stream into multiple data columns and transferring each of the data columns using DMA (Direct Memory Access).

Furthermore, various settings can be assumed as an example of multiple cryptographic computations with non-unique computation methods for a stream, such as a case where a key is used for decryption and another key is used for encryption thereafter. In such a case, in the conventional confidential information processing device according to Japanese Unexamined Patent Application Publication No. 2006-41684, input and output of the stream have to be performed more than twice, for example, decrypting for the first time and encrypting for the second time. Thus, the conventional confidential information processing device has a problem that the complex control by software is required.

In view of the problem, it is an object of the present invention to provide a confidential information processing device, a confidential information processing apparatus, a confidential information processing method which can easily perform multiple cryptographic computation using non-unique computation methods.

SUMMARY OF THE INVENTION

In order to achieve the above object, the confidential information processing device according to the present invention is the confidential information processing device which performs a plurality of cryptographic computations on different target data included in a data stream inputted from an external device, the confidential information processing device including: at least one stream analysis unit which determines the target data by analyzing the data stream; at least one cryptographic computation unit which holds a context including at least one of a key used for the cryptographic computation, an initial value, and intermediate information during cryptographic computation, and perform the cryptographic computation using the context that is being held; a context storage unit which stores a plurality of the contexts; a correspondence table storage unit which stores a correspondence table which indicates the number of cryptographic computations to be performed for the data stream and a context to be used for each of the cryptographic computations; a context control unit which, when the context held in the cryptographic computation unit does not match the context to be used indicated in the correspondence table, saves the context held in the cryptographic computation unit to the context storage unit and restore the context to be used for the cryptographic computation indicated in the correspondence table out of the plurality of contexts stored in the context storage unit to the cryptographic computation unit; and a stream control unit which outputs the data stream on which the cryptographic computation is performed by the cryptographic computation unit to the external device, the number of the cryptographic computations being the number indicated in the correspondence table, and to output the data stream on which the cryptographic computation is performed by the cryptographic computation unit to the stream analysis unit, the number of the cryptographic computation not meeting the number of cryptographic computations indicated in the correspondence table.

With this configuration, based on the number of cryptographic computation shown in the correspondence table, the context control unit outputs the stream on which the cryptographic computation is performed to the external device or other stream analysis unit. Thus, by setting the number of cryptographic computation on the correspondence table, the number of computation can be set to any number. Thus, the confidential information processing device according to the present invention can perform any number of cryptographic computation on one stream. Furthermore, without outputting the stream whenever a cryptographic computation is completed, multiple cryptographic computations can be performed with one stream input. In addition, by setting the number of cryptographic computation on the correspondence table, the number of computation can be easily changed.

Furthermore, multiple contexts are stored in the context storage unit. In addition, the context control unit saves and restores the context to be used for the cryptographic computation. With this, reading corresponding context from the context storage unit facilitates the use of multiple computation methods. In addition, since the cryptographic computation unit only has to include a register and the like in which at least one context can be stored, it is possible to reduce the circuit scale of the cryptographic computation unit. In addition, setting the contexts for multiple computation methods and storing the context to the context storage unit facilitates, for example, change and addition of the computation methods.

As described above, the confidential information processing device according to the present invention can easily perform multiple cryptographic computation using non-unique computation methods and can facilitate the control by software.

In addition, the at least one of the stream analysis units may include a first stream analysis unit and a second stream analysis unit each of which determines the target data by analyzing the data stream, and the stream control unit outputs the data stream to the first stream analysis unit and to output the data stream on which the first cryptographic computation is performed by the cryptographic computation unit to the second stream analysis unit when the correspondence table indicates that two or more cryptographic computations are performed.

With this configuration, when multiple cryptographic computations are performed on one stream, different stream analysis units determine data in different areas of the input stream for each of the cryptographic computations. With this, cryptographic computation can be performed on the data included in an arbitrary area of the stream with a simple software control even when the data within the input stream for cryptographic computation differs in multiple cryptographic computations.

In addition, the at least one of the cryptographic computation unit may include: a first computation unit which performs a cryptographic computation for the target data using a first cryptographic algorithm; and a second computation unit which performs a cryptographic computation for the target data using a second cryptographic algorithm which is different from the first cryptographic algorithm, and the first computation unit and the second computation unit respectively hold at least one of the contexts.

With this configuration, when multiple cryptographic computations are performed on one stream, each of the cryptographic computations can be performed in different computation units. With this, it is not necessary to save and restore context for each cryptographic computation even when each of the computation units hold only one context. Thus, the confidential information processing device according to the present invention can perform high-speed cryptographic computation. Furthermore, by including multiple computation units for cryptographic computations using different streams, the confidential information processing device according to the present invention can perform cryptographic computations using multiple cryptographic algorithms. Therefore, the confidential information processing device according to the present invention can perform cryptographic computations using multiple computation methods.

In addition, at least one of the cryptographic computation units may includes a hash computation unit operable to generate a hash value by performing a hash computation for the target data, the context includes the hash value generated by the hash computation unit, the stream control unit outputs the data stream on which the hash computation is performed by the hash computation unit to the external device or the stream analysis unit in the same state as the data stream is originally inputted from the external device.

With this configuration, the hash value generated in the hash computation is stored as the context. In addition, the original stream is outputted to outside or other stream analysis unit. Thus, after the hash computation is performed, other cryptographic computation can be performed on the stream. Therefore, the confidential information processing device according to the present invention can perform multiple, different types of cryptographic computations with one stream input.

In addition, at least one of the cryptographic computation units may include a hash computation unit operable to generate a hash value by performing a hash computation for the target data, the context includes hash value replacement position information which indicates a predetermined position of data included in the data stream, the hash computation unit is operable to replace the data at the predetermined position indicated by the hash value replacement position information corresponding to the data stream with the hash value, and the stream control unit is operable to output the data stream in which the data at the predetermined position is replaced with the hash value by the hash computation unit to the external device or the stream analysis unit.

With this configuration, the hash value can be incorporated in any position, and the stream in which the hash value is incorporated can be outputted to the external device or other stream analysis unit. In addition, by setting the hash value replacement position information included in the context, it is possible to easily set whether or not the hash value is replaced and that the hash value is replaced to any position. Therefore, the confidential information processing device according to the present invention can perform multiple, different types of cryptographic computations with one stream input.

In addition, at least one of the cryptographic computation units may include a hash computation unit which generates a hash value by performing a hash computation for the target data, the context includes hash value comparison position information which indicates a predetermined position of the data included in the data stream, and the hash computation unit judges whether or not the data at the predetermined position indicated in the hash value comparison information corresponding to the data stream and matches the hash value.

With this configuration, the stream is authenticated by comparing the hash value and the data in any position of the stream. In addition, by setting the hash value comparison position information included in the context, it is possible to easily set whether or not the hash value is compared and that the hash value is compared to any position. Therefore, the confidential information processing device according to the present invention can perform multiple cryptographic computations with simple control.

In addition, at least one of the cryptographic computation units may include a secret key cryptography computation unit which generates a message authentication code by performing a computation in an authentication mode for the target data using the secret key cryptography algorithm, the context includes the message authentication code generated by the secret key cryptography computation unit, the stream control unit outputs the data stream on which the secret key cryptography computation unit has performed a computation in the authentication mode to the external device or the stream analysis unit in the same state in which the data stream is originally inputted from the external device.

With this configuration, the message authentication code generated by the computation in the authentication mode using the secret key cryptography algorithm is stored as the context. In addition, the original stream is outputted to the external device or other stream analysis unit. Therefore, after the computation in authentication mode using the secret key cryptographic algorithm is performed, other cryptographic computation can be continuously performed on the stream. Therefore, the confidential information processing device according to the present invention can perform multiple, different types of cryptographic computations with one stream input.

In addition, at least one of the cryptographic computation units may include a secret key cryptography computation unit which generates a message authentication code by performing a computation in an authentication mode for the target data using the secret key cryptography algorithm, the context includes message authentication code replacement position information which indicates a predetermined position of the data included in the data stream, the secret key cryptography computation unit replaces the data at the predetermined position indicated by the message authentication code replacement position information with the message authentication code, and the stream control unit outputs the data stream in which the data at the predetermined position is replaced with the message authentication code by the secret key cryptography computation unit to the external device or the stream analysis unit.

With this configuration, the message authentication code is incorporated in any position, and the stream in which the authentication code is incorporated to outside, or to other stream analysis unit. In addition, by setting the message authentication code replacement position information, it is possible to easily set whether or not the message authentication code is replaced, and that the message authentication code is replaced to any position. Therefore, the confidential information processing device according to the present invention can perform multiple, different types of cryptographic computations with one stream input.

In addition, at least one of the cryptographic computation units includes a secret key cryptography computation unit operable to generate a message authentication code by performing a computation in an authentication mode for the target data using the secret key cryptography algorithm, the context includes message authentication code comparison position information which indicates a predetermined position of the data included in the data stream, the secret key cryptography computation unit judges whether or not the data at the predetermined position indicated by the message authentication comparison information corresponding to the data stream matches the message authentication code.

With this configuration, the stream is authenticated by comparing the message authentication code and the data in any position of the stream. In addition, by setting the message authentication code comparison position information, it is possible to easily set whether or not the message authentication code is compared, and that the message authentication code is compared to any position. Therefore, the confidential information processing device according to the present invention can perform multiple cryptographic computations with simple control.

In addition, the context may includes fraction data which is a target data not fulfilling meeting the computation unit of computation for the cryptographic computation when the data amount of the target data is not an integral multiple of the computation unit of computation, and the cryptographic computation unit is operable to perform the cryptographic computation for the target data including the target fraction data included in the context when performing the cryptographic computation for a subsequent data stream.

With this configuration, the confidential information processing device according to the present information can continuously process the subsequent stream without outputting the fraction data to outside. Thus, the external device (CPU and others) does not need to perform processing such as connecting the fraction data which was not cryptographically computed to the subsequent stream input. Therefore, the confidential information processing device according to the present invention can reduce the amount of processing performed by the external device.

In addition, the context may include successive processing information which indicates a plurality of separate areas in the data stream, and the cryptographic computation unit performs cryptographic computation for the data indicated in the separate areas indicated in the successive processing information as one data.

With this configuration, cryptographic computation on the data in separated areas in a stream as a piece of data can be performed. In addition, by setting the successive processing information included in the context, it is possible to set whether or the processing is performed or not. Therefore, the confidential information processing device according to the present invention can perform multiple cryptographic computations with simple control.

In addition, the context may include area information which indicates an area where cryptographic computation is performed in the data included in the data stream, and the plurality of stream analysis unit determines the target data in the area indicated by the area information.

With this configuration, the data included in any area of the stream is determined as the target data by the stream analysis unit. Thus, the confidential information processing device according to the present invention can perform a cryptographic computation on the data in any area included in the stream. In addition, by setting the area information included in the context, it is possible to set the target data for cryptographic computation. Therefore, the confidential information processing device according to the present invention can perform multiple cryptographic computations with simple control.

In addition, the stream control unit may include a buffer which holds a data stream on which cryptographic computation is performed by the cryptographic computation unit and outputs the data stream that is being held in to the stream analysis unit.

With this configuration, it is possible to hold the stream in which the first cryptographic computation is performed to the buffer, and the second cryptographic computation can be sequentially performed on the stream that is held in the buffer.

In addition, the confidential information processing device may further include a arbitration unit operable to select one of the data streams out of the data streams in which the target data is judged by the first stream analysis unit and the second stream analysis unit, in which the cryptographic computation unit performs cryptographic computation for the target data included in the data stream outputted from the arbitration unit using the context being held.

With this configuration, it is possible to form arbitrary paths between the stream analysis units and the cryptographic computation unit by the arbitration unit. With this, multiple cryptographic computations using the same algorithm with one stream input (for example, encrypting after decrypting)

can be performed. Furthermore, then requests for multiple cryptographic computation for the same cryptographic computation unit occur simultaneously, the arbitration unit determines the stream which is to be cryptographically computed base on the priority and the like.

In addition, at least one of the cryptographic computation unit may include a secret key cryptography computation unit which performs a secret key cryptography computation, and a hash computation unit which performs the hash computation for the target data.

With this configuration, the secret key cryptographic computation and the hash cryptographic computation can be performed on one stream. Therefore, the confidential information processing device according to the present invention can perform multiple, different types of cryptographic computations with one stream input.

In addition, a confidential information processing apparatus which performs a plurality of cryptographic computations on different target data included in a data stream inputted from an external device, the confidential information processing apparatus including: a receiving unit which receives the data stream transmitted from an external apparatus, at least one stream analysis unit which determines the target data by analyzing the data stream; at least one cryptographic computation unit which holds a context including at least one of a key used for the cryptographic computation, an initial value, and intermediate information during cryptographic computation, and perform the cryptographic computation using the context that is being held; a context storage unit which stores a plurality of the contexts; a correspondence table storage unit which stores a correspondence table which indicates the number of cryptographic computations to be performed for the data stream and a context to be used for each of the cryptographic computations; a context control unit which, when the context held in the cryptographic computation unit does not match the context to be used indicated in the correspondence table, saves the context held in the cryptographic computation unit to the context storage unit and restore the context to be used for the cryptographic computation indicated in the correspondence table out of the plurality of contexts stored in the context storage unit to the cryptographic computation unit; a display unit operable to reproduce and display the data stream; and a stream control unit which outputs the data stream on which the cryptographic computation is performed by the cryptographic computation unit to the external device, the number of the cryptographic computations being the number indicated in the correspondence table, and to output the data stream on which the cryptographic computation is performed by the cryptographic computation unit to the stream analysis unit, the number of the cryptographic computation not meeting the number of cryptographic computations indicated in the correspondence table.

With this configuration, in the confidential information processing device which receives, reproduces, and displays the encrypted data, multiple cryptographic computations using different computation methods on one stream and an easy control by software can be achieved.

In addition, the confidential information processing apparatus according to the present invention is a confidential information processing apparatus which performs a plurality of cryptographic computations on different target data included in a data stream, the confidential information processing apparatus including: at least one stream analysis unit which determines the target data by analyzing the data stream; at least one cryptographic computation unit which holds a context including at least one of a key used for the cryptographic computation, an initial value, and intermediate information during cryptographic computation, and perform the cryptographic computation using the context that is being held; a context storage unit which stores a plurality of the contexts; a correspondence table storage unit which stores a correspondence table which indicates the number of cryptographic computations to be performed for the data stream and a context to be used for each of the cryptographic computations; a context control unit which, when the context held in the cryptographic computation unit does not match the context to be used indicated in the correspondence table, saves the context held in the cryptographic computation unit to the context storage unit and restores the context to be used for the cryptographic computation indicated in the correspondence table out of the plurality of contexts stored in the context storage unit to the cryptographic computation unit; a transmitting unit which transmits the data stream to an external apparatus; and a stream control unit operable to output the data stream on which the cryptographic computation is performed by the cryptographic computation unit to the external device, the number of the cryptographic computations being the number indicated in the correspondence table, and to output the data stream on which the cryptographic computation is performed by the cryptographic computation unit to the stream analysis unit, the number of the cryptographic computation not meeting the number of cryptographic computations indicated in the correspondence table.

With this configuration, in the confidential information processing device which encrypts the plain data and transmits the encrypted data to the external apparatus, multiple cryptographic computations using different computation methods on one stream and an easy control by software can be achieved.

In addition, the confidential information processing method according to the present invention is a confidential information processing method in a confidential information processing device which performs a plurality of cryptographic computations on different target data included in a first data stream inputted from an external device, the confidential information processing device including: at least one stream analysis unit which determines the target data by analyzing a data stream; at least one cryptographic computation unit which holds a context including at least one of a key used for the cryptographic computation, an initial value, and intermediate information during cryptographic computation, and perform the cryptographic computation using the context that is being held; a context storage unit which stores a plurality of the contexts; a correspondence table storage unit which stores a correspondence table which indicates the number of cryptographic computations to be performed for the data stream and a context to be used for each of the cryptographic computations; a context control unit which, when the context held in the cryptographic computation unit does not match the context to be used indicated in the correspondence table, saves the context held in the cryptographic computation unit to the context storage unit and restores the context to be used for the cryptographic computation indicated in the correspondence table out of the plurality of contexts stored in the context storage unit to the cryptographic computation unit; and a stream control unit which outputs the data stream on which the cryptographic computation is performed by the cryptographic computation unit to the external device or the stream analysis unit, and the confidential information processing method including steps of: determining the first target data out of the first data stream in the stream analysis unit; generating a second data stream by performing a cryptographic computation on the first target data included in the first data stream in the cryptographic computation unit; outputting, by the stream control unit, the second data stream to the stream analysis unit; determining a second target data out of the second data stream in the stream analysis unit; and generating a third data stream by performing cryptographic computation on the second target data included in the second data stream, when the correspondence table indicates two or more cryptographic computations are performed on the first data stream.

With this, based on the number of cryptographic computation shown in the correspondence table, the context control unit outputs the stream on which the cryptographic computation is performed to the external device or other stream analysis unit. Thus, by setting the number of cryptographic computation on the correspondence table, the number of computation can be set to any number. Thus, the confidential information processing method according to the present invention can perform any number of cryptographic computations on one stream. Furthermore, without outputting the stream whenever a cryptographic computation is completed, multiple cryptographic computations can be performed with one stream input. In addition, by setting the number of cryptographic computation on the correspondence table, the number of computation can be easily changed.

Furthermore, multiple contexts are stored in the context storage unit. In addition, the context control unit saves and restores the context to be used for the cryptographic computation. With this, reading corresponding context from the context storage unit facilitates the use of multiple computation methods. In addition, since the cryptographic computation unit only has to include a register and the like in which at least one context can be stored, it is possible to reduce the circuit scale of the cryptographic computation unit. In addition, setting the contexts for multiple computation methods and storing the context to the context storage unit facilitates, for example, change and addition of the computation methods.

As described above, the confidential information processing method according to the present invention can easily perform multiple cryptographic computations on one stream using non-unique computation methods and can facilitate the control by software.

Therefore, the present invention provides a confidential information processing device, a confidential information processing apparatus, a confidential information processing method which perform multiple cryptographic computations on one stream using non-unique computation methods, and facilitates control by software.

Further Information about Technical Background to this Application

The disclosure of Japanese Patent Application No. 2007-005638 filed on Jan. 15, 2007 and No. 2007-224262 filed on Aug. 30, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 shows an example of the context storage table according to the embodiment of the present invention;

DESCRIPTION OF THE PREFERRED EMBODIMENT

An embodiment of the confidential information processing device according to the present invention will be described hereafter with reference to the drawings.

First of all, the configuration of confidential information processing apparatus that includes the confidential information processing device according to the embodiment of the present invention.

Figure 1:
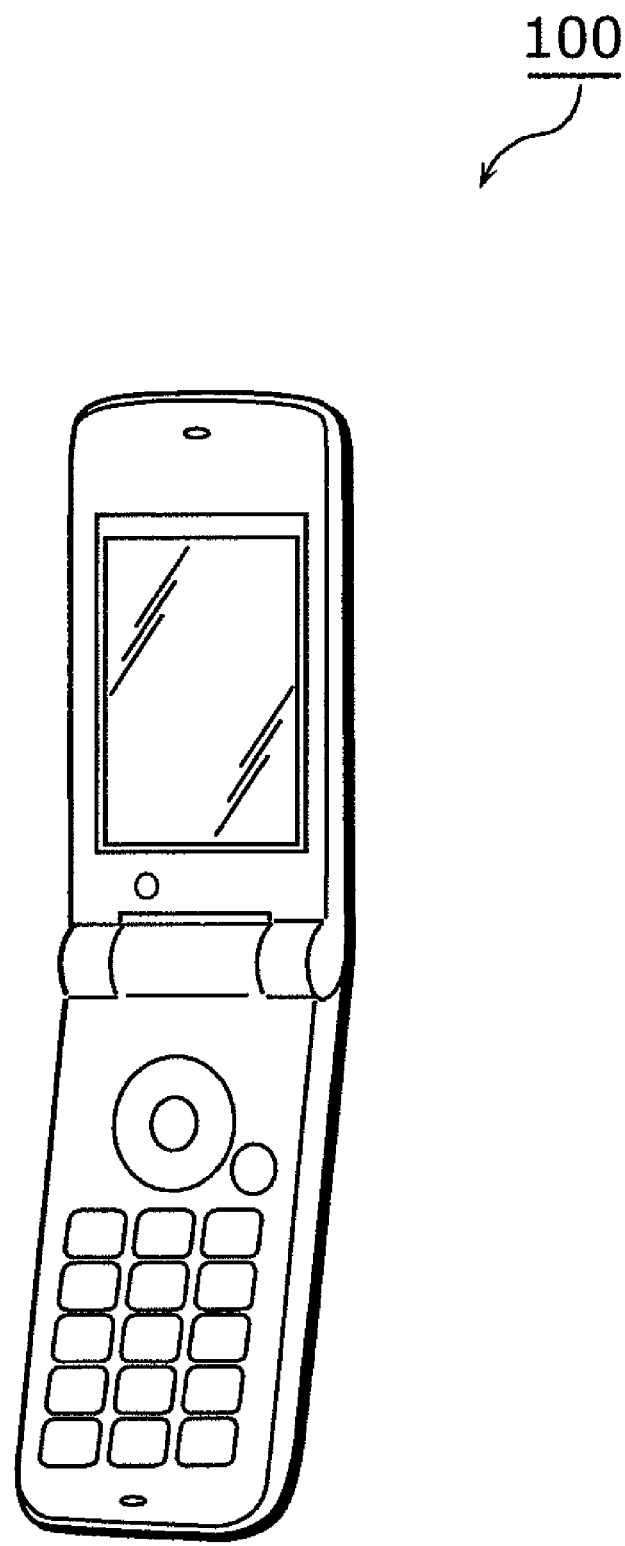
FIG. 1 shows an exterior view of the confidential information processing apparatus according to the embodiment of the present invention.

FIG. 1 shows an example of exterior view of the confidential information processing apparatus according to the embodiment of the present invention. As shown in FIG. 1, the confidential information processing device 100 is, for example, a mobile phone apparatus.

Figure 2:
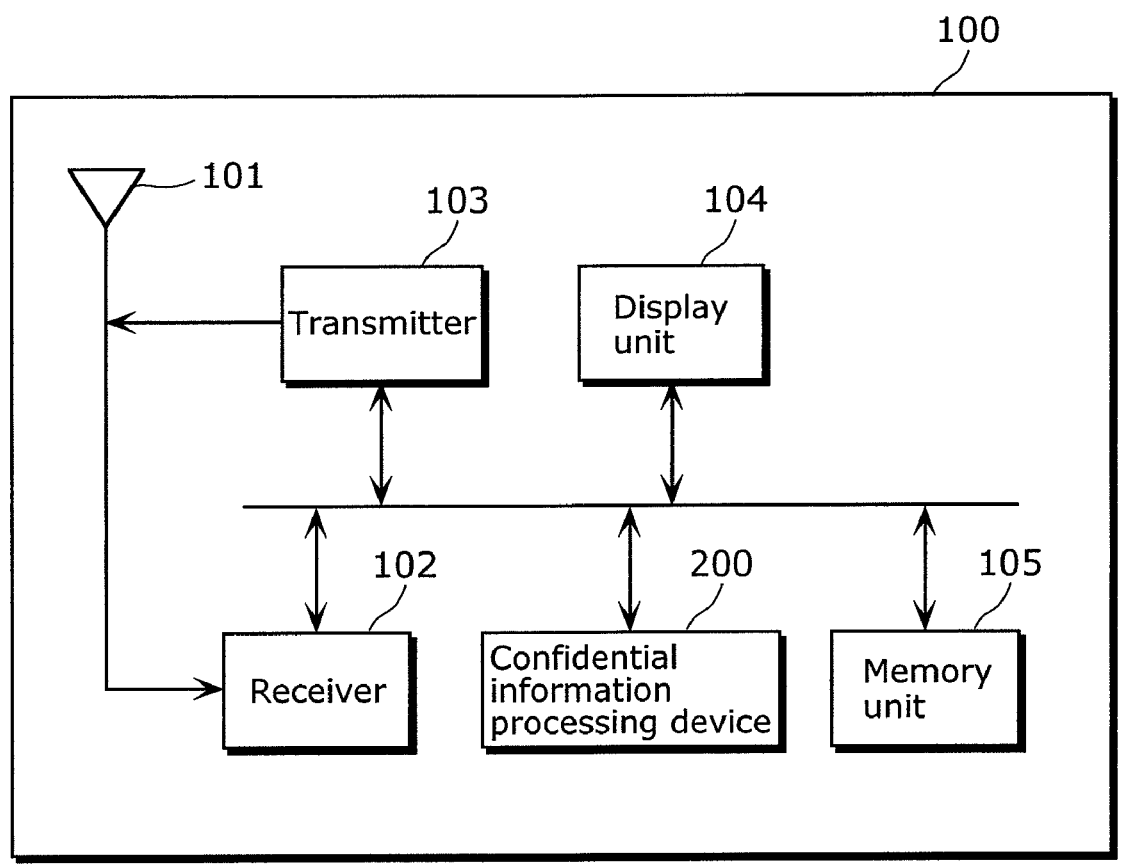
FIG. 2 shows a block diagram of the configuration of confidential information processing apparatus according to the embodiment of the present invention.

FIG. 2 shows a block diagram of the confidential information processing apparatus. The confidential information processing device 100 can perform multiple cryptographic computations for different target data included in a stream. In addition, the confidential information processing device 100 can perform cryptographic computation for multiple convergent streams. The confidential information processing apparatus 100 includes an antenna 101, a receiver 102, a transmitter 103, a display 104, a memory unit 105 and a confidential information processing device 200.

The antenna 101 is an antenna used for transmission or reception.

The receiver 102 receives a stream such as a video stream and an audio stream and the like transmitted from an external device using the antenna 101.

The memory unit 105 stores the stream received by the receiver 102. In addition, the memory unit 105 stores video data and the like, which is generated by the confidential information processing apparatus 100. For example, the memory unit 105 stores video data captured by a camera (not shown) included in the confidential information processing apparatus 100. The memory unit 105 is, for example, a RAM, a hard disk, or a non-volatile memory and others.

The confidential information processing device 200 is the confidential information processing device according to the embodiment of the present invention. The confidential information processing device 200 decrypts the encrypted data included in the stream received by the receiver 102. The confidential information processing device 200 encrypts the text data included in the stream received by the receiver 102, and the video data held in the memory unit 105.

The transmitter 103 transmits the stream encrypted by the confidential information processing device 200 to an external device using the antenna 101.

The display 104 reproduces and displays the stream decrypted by the confidential information processing device 200.

Note that the confidential information processing device 200 may perform cryptographic computation for the data to be recorded in the recording media (SD memory and the like). In addition, the confidential information processing device 200 may perform cryptographic computation for the data which is transmitted to and received from the external device connected via the network.

Furthermore, the functions of the receiver 102 and the transmitter 103 may be realized by a proprietary circuit, or program execution by a CPU and the like.

Next, the configuration of the confidential information processing device 200 is described.

Figure 3:
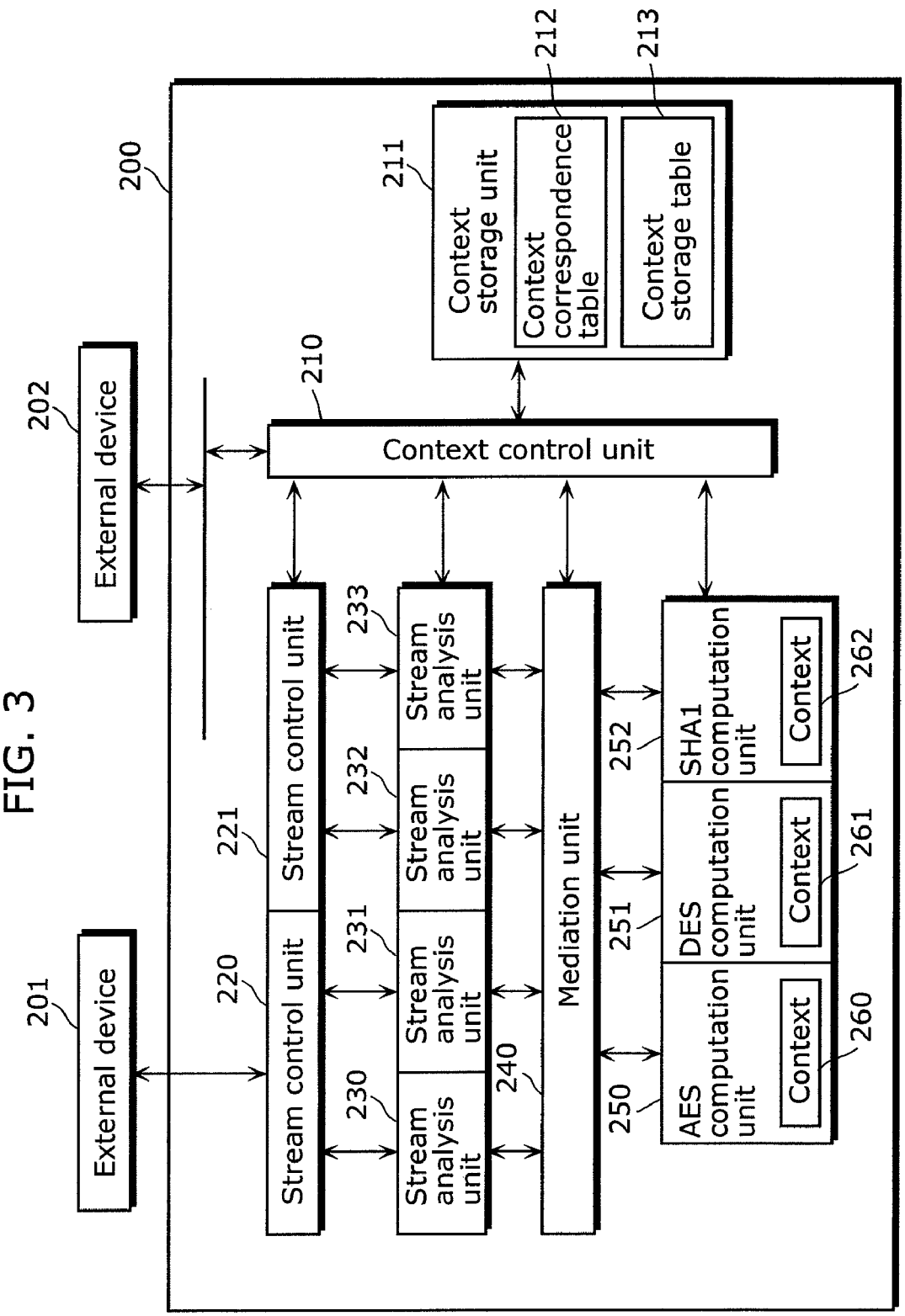
FIG. 3 shows a block diagram of configuration of the confidential information processing device according to the embodiment of the present invention.

FIG. 3 shows a block diagram of configuration of the confidential information processing device 200 according to the embodiment of the present invention.

The confidential information processing device 200 can perform two cryptographic computations for different target data included in a stream. In addition, the confidential information processing device 200 can perform a cryptographic computation for two convergent streams. The confidential information processing device 200 includes a context control unit 210, a context storage unit 211, stream control units 220 and 221, stream analysis units 230, 231, 232, and 233, a arbitration unit 240, an AES computation unit 250, a DES computation unit 251, and a SHA 1 computation unit 252.

The context storage unit 211 stores a context correspondence table 212 and a context storage table 213. The context storage unit 211 is configured with, for example, a RAM. Note that the context storage unit 211 may be configured with a hard disk, or a non-volatile memory and others.

The context correspondence table 212 is a table showing a type of stream, the number of cryptographic computation to be performed for the stream, a type of context corresponding to each of the cryptographic computations. Here, the context refers to information required for the cryptographic computation.

The information required for the cryptographic computation of stream is stored as a context in the context storage table 213. In other words, the context storage unit 211 stores multiple contexts. The multiple contexts included in the context storage table 213 include a type of context (context ID) and information required for cryptographic computation each of which corresponds to the type of context. More specifically, the context includes a key used for the cryptographic computation, an initial value and interim information during the cryptographic computation (such as computation results of a prior block in the CBC mode computation) and others. In addition, the context includes information indicating an area in the data included in the stream, where the cryptographic computation is performed.

Note that the context correspondence table 212 and the context storage table 213 to be stored in the context storage unit 211 is set by the external device 202 before the input of the stream which performs the cryptographic computation.

The stream control unit 220 outputs the stream inputted by the external device 201 (hereinafter referred to as "input stream" to the stream analysis unit 230 or 231. In addition, the stream control unit 220 outputs the outputted stream which is cryptographically computed (hereinafter referred to as "output stream") to the external device 201 or other stream analysis unit 230 or 231, in accordance with the context correspondence table 212.

In addition, the stream control unit 220 identifies the attribute of the stream inputted from the external device 201. The stream control unit 220 configures and controls the data paths among the external device 201, the stream analysis unit 230 and the stream analysis unit 231 based on the stream ID which is the identification result and the context correspondence table 212.

Figures 4, 5:
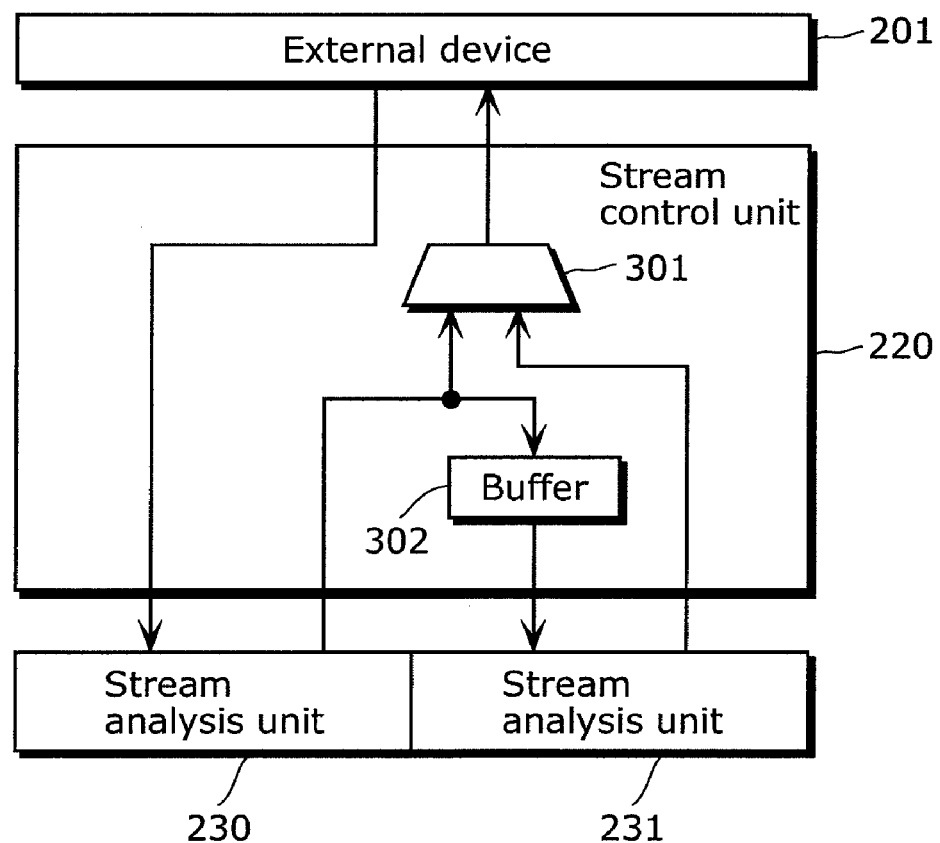
FIG. 4 shows an example of the context correspondence table according to the embodiment of the present invention.
FIG. 5 shows a block diagram of configuration of the stream control unit according to the embodiment of the present invention.

FIG. 4 shows an example configuration of the context correspondence table 212.

Information related to the computation method and the order of computation for the inputted stream is stored in the context correspondence table 212. As shown in FIG. 4, the context correspondence table 212 is a table in which an identifier for the context of the cryptographic computation to be executed (context ID) corresponding to the stream identifier (stream ID). In the context correspondence table 212, the context IDs which correspond to the first cryptographic computation and the context IDs which correspond to the second cryptographic computation are listed.

The stream control unit 220 determines to perform two successive cryptographic computations for the inputted stream when the context ID in the second stage is specified for the stream ID of the inputted stream in the context correspondence table 212, and to perform only one cryptographic computation when the context ID in the second stage is not specified. For example, in the example shown in FIG. 4, for the stream with the stream ID "2", a cryptographic computation using the context ID "2" is performed, and a cryptographic computation using the context ID "3" is performed on the stream after the cryptographic computation using the context ID "2" is performed. In addition, for the stream with the stream ID "0", a cryptographic computation corresponding to the context ID "0", and the second cryptographic computation is not performed.

For example, the content of the context correspondence table 212 is set by the external device 202 before the stream is inputted.

FIG. 5 shows the configuration of the stream control unit 220.

The stream control unit 220 includes a selector 301 and a buffer 302. The selector 301 selects the output stream outputted from the stream analysis unit 230 or 231, and outputs the output stream to the external device 201. The buffer 302 holds the output stream outputted from the stream analysis unit 230, and outputs the output stream being held to the stream analysis unit 231. In addition, the stream control unit 220 outputs the input stream inputted from the external device 201 to the stream analysis unit 230.

More specifically, when a cryptographic computation is performed for the input stream, the selector 301 selects the output stream outputted from the stream analysis unit 230, and outputs the output stream to the external device 201. When two cryptographic computations are performed for the input stream, the selector 301 selects the output stream outputted from the stream analysis unit 231, and outputs the output stream to the external device 201.

To put it differently, when one cryptographic computation is performed for the input stream inputted from the external device 201, the stream control unit 220 outputs the input stream inputted from the external device 201, and outputs the output stream outputted from the stream analysis unit 230 to the external device 201.

In addition, when two cryptographic computations are performed for the input stream inputted from the external device 201, the stream control unit 220 outputs the input stream inputted from the external device 201 to the stream analysis unit 230, and outputs the stream after two cryptographic computations that is outputted from the stream analysis unit 231 to the external device 201. Furthermore, the stream control unit 220 holds the stream after one cryptographic computation, outputted from the stream analysis unit 230 in the buffer 302, and the buffer 302 outputs the output stream which is being held to the stream analysis unit 231.

Here, the external device 202 is, for example, the CPU included in the confidential information processing apparatus 100. In addition, the external device 201 is, for example, the CPU, the DMA controller or the DSP (Digital Signal Processor) included in the confidential information processing apparatus 100.

The external devices 201 and 202 can rewrite the context correspondence table 212 and the context storage table 213 stored in the context storage unit 211 via the context control unit 210. In addition, the external devices 201 and 202 can read the context correspondence table 212 and the context storage table 213 via the context control unit 210. Note that the confidential information processing device 200 may include the external device 201 and 202.

The stream control unit 221 outputs the input stream inputted from the external device 202 to the stream analysis unit 232 or 233. In addition, the stream control unit 221 outputs the cryptographically computed output stream outputted from the stream analysis unit 232 or 233 to the external device 202 or other stream analysis unit 232 or 233.

Note that, since the configuration and the detailed operation of the stream control unit 221 are the same as those of the stream control unit 220, the description is omitted.

The stream analysis units 230 and 231 determine the target data which is to be the target of cryptographic computation from the input stream outputted from the stream control unit 220 based on the context included in the context storage table 213 corresponding to the stream. The stream analysis units 230 and 231 output information for identifying the target data and the input stream to the arbitration unit 240.

More specifically, the stream analysis units 230 and 231 hold a pair of contexts which correspond to the input stream. The stream analysis units 230 and 231 determine the data in the area which is indicated by the information included in the context being held, the information showing the area where the cryptographic computation is performed. In addition, the stream analysis units 230 and 231 output the output stream outputted from the arbitration unit 240 to the stream control unit 220.

The stream analysis units 232 and 233 determine the target data which is to be the target of cryptographic computation from the input stream outputted from the stream control unit 221 based on the context included in the context storage table 213 corresponding to the stream. The stream analysis units 232 and 233 output information for identifying the target data and the input stream to the arbitration unit 240.

More specifically, the stream analysis units 232 and 233 hold a pair of contexts which correspond to the input stream. The stream analysis units 232 and 233 determine the data in the area which is indicated by the information showing the area where the cryptographic computation is performed, included in the context being held. In addition, the stream analysis units 232 and 233 output the output stream outputted from the arbitration unit 240 to the stream control unit 221.

The arbitration unit 240 arbitrates the input stream outputted from the stream analysis units 230, 231, 232, and 233. More specifically, the arbitration unit 240 determines which input streams from the stream analysis units 230, 231, 232, and 233 are processed when the input streams which are to be processed using the same cryptographic algorithm are inputted from the stream analysis units 230, 231, 232, and 233. To put it differently, the arbitration unit 240 processes input stream sequentially based on an appropriate order of arbitration. For example, the arbitration unit 240 determines the input request to be processed according to the priority level set in the stream analysis units 230, 231, 232 and 233. Note that the arbitration unit 240 may determine the input request to be processed using other algorithms such as the round-robin method.

The arbitration unit 240 determines the cryptographic algorithm to be used for processing based on the context storage table when the input stream outputted from the stream analysis units 230, 231, 232, and 233 is received. The arbitration unit 240 outputs the input stream and the information for identifying the target data to the computation unit 250, 251 or 252 which corresponds to the determined cryptographic algorithm.

In addition, the arbitration unit 240 outputs the output stream from the computation unit 250, 251 or 252 to the stream analysis unit 230, 231, 232 or 233 from which the input stream is originally outputted.

The AES computation unit 250 performs cryptographic computation using the secret key cryptography algorithm AES (Advanced Encryption Standard) for the target data which is the part for computation included in the input stream inputted from the arbitration unit 240.

The DES computation unit 251 performs cryptographic computation using the secret key cryptography algorithm DES (Data Encryption Standard) for the target data which is the part for computation included in the input stream inputted from the arbitration unit 240.

More specifically, the AES computation unit 250 and the DES computation unit 251 performs cryptographic computation for the target data identified by the stream analysis unit

230, 231 or 233 based on the information for identifying the target data outputted from the arbitration unit 240.

More specifically, the AES computation unit 250 and the DES computation unit 251 encrypt or decrypt the target data by performing the confidential mode computation in ECB (Electronic Codebook) mode and CBC (Cipher Block Chain) mode and others for the target data.

In addition, the AES computation unit 250 and the Des computation unit 251 generate a message authentication code (MAC value) by performing computation in the authentication mode such as CBC-MAC (Message Authentication Code) mode and CMAC (Cipher-based Message Authentication Code) mode to the target data.

In addition, the AES computation unit 250 and the DES computation unit 251 encrypt or decrypt the target data and generate a MAC value by performing the confidential mode computation with authentication such as CCM (Counter-mode with CBC-MAC) mode and GCM (Galois/Counter Mode) and others for the target data.

The AES computation unit 250 and the DES computation unit 251 outputs the output stream to the arbitration unit 240 when performing the computation in confidential mode, leaving the input data except for the computation target part and replacing the computation target part with the computation result in the confidential mode.

In addition, the AES computation unit 250 and the DES computation unit 251 outputs the input stream inputted from the arbitration unit 240 directly to the arbitration unit 240 as an output stream when the operation is performed in the authentication mode. In addition, the AES computation unit 250 and the DES computation unit 251 output the MAC value which is the computation result of the computation target part in the authentication mode to the context control unit 210 as a context.

In addition, when performing an operation in the confidential mode with authentication, the AES computation unit 250 and the DES computation unit 251 leave the inputted data in the input stream inputted from the arbitration unit 240 which is not to be computed, and output the output stream in which the computed part is replaced with the computation result in the confidential mode included in the confidential mode with authentication to the arbitration unit 240. Furthermore, the AES computation unit 250 and the DES computation unit 251 outputs the MAC value which is the computation result of the performed in the authentication mode included in the confidential mode with authentication to the context control unit 210 as a context.

In addition, the AES computation unit 250 and the DES computation unit 251 outputs the input stream inputted from the arbitration unit 240 to the arbitration unit 240 as an output stream after replacing the specified part to the MAC value based on the setting in the context storage table 213.

In addition, the AES computation unit 250 and the DES computation unit 251 compare a part of the input stream inputted from the arbitration unit 240 and the MAC value based on the setting in the context storage table 213.

The SHA 1 computation unit 252 performs a computation using the hash algorithm SHA (Secure Hash Algorithm) for the part to be computed among the input stream inputted from the arbitration unit 240.

More specifically, the SHA 1 computation unit 252 generates a hash value or a MAC value by performing computations in normal hash computation and the HMAC (Keyed-Hashing for Message Authentication Code) mode.

The SHA 1 computation unit 252 outputs the input stream inputted from the arbitration unit 240 directly to the arbitration unit 240 when performing the normal hash computation or a computation in the HMAC mode and others. In addition, the SHA 1 computation unit 252 outputs the hash value or the MAC value which is the computation result for the computed part in the normal hash computation or the HMAC mode to the context control unit 210.

In addition, the SHA 1 computation unit 252 replaces the specified part of the input stream inputted from the arbitration unit 240 based on the setting in the context storage table 213 and outputs to the arbitration unit 240 as the output stream.

In addition, the SHA 1 computation unit 252 compares the specified part of the input stream inputted from the arbitration unit 240 based on the setting in the context storage table 213 with the hash value or the MAC value.

As described above, the AES computation unit 250 and the DES computation 251 output the output stream of the same length as the input stream in the same manner as in the confidential mode, in the confidential mode with authentication. In addition, the SHA 1 computation unit 252 outputs the output stream the same length as the input stream. Thus, it is possible to use the same method for inputting and outputting stream regardless of the algorithm or mode of the secret key cryptography algorithm and hash algorithm. With this, the confidential information processing device 200 can perform multiple computations of the input stream with a simple control.

In addition, each of the AES computation unit 250, the DES computation 251 and the SHA 1 computation unit 252 holds each of the pairs of context 260, 261, and 262. The AES computation unit 250, the DES computation 251 and the SHA 1 computation unit 252 performs cryptographic computation using each of the pairs of context 260, 261, and 262.

The context control unit 210 saves the contexts 260, 261 and 262 held in the computation units 250, 251 and 252 to the context storage unit 211 and restores the context used for cryptographic computation by the computation units 250, 251 and 252 by writing the context to the computation units 250, 251 and 252.

In addition, the context control unit 210 saves the context held by the stream analysis units 230, 231, 232 and 233 to the context storage unit 211, and writes the context which corresponds to the input stream out of the contexts stored in the context storage unit 211 when the stream analysis units 230, 231, 232 and 233 do not hold the context which corresponds to the input stream.

In addition, the context control unit 210, the stream control units 220 and 221, the stream analysis units 230, 231, 232 and 233, the arbitration unit 240, the AES computation unit 250, the DES computation unit 251 and the SHA 1 computation unit 252 are configured by the proprietary circuits (hardware).

FIG. 6 shows an example of the context storage table 213.

The context storage table 213 stores multiple contexts and each of the contexts are identified using context IDs.

Each context included in the context storage table 213 includes a context ID, an algorithm, a mode, a header length, a payload length, a footer length, a fraction output flag, a number of successive payloads, a stream non-output flag, a position for replacing hash value, a hash value comparison position, a key and a initial value, intermediate information and a hash value.

The algorithm included in the context is an encryption algorithm used for the cryptographic computation for the input stream. The mode included in the context is an encryption mode used for the cryptographic computation for the input stream. For example, in the context storage table 213, the context ID "0" indicates that the input stream is decoded in the CBC mode using the secret key encryption algorithm AES.

In addition, each of the algorithms included in the context respectively correspond to the computation units 250, 251, and 252 included in the confidential information processing device 200. In the example shown in FIG. 6, the algorithms "AES", "DES" and "SHA 1" respectively correspond to the AES computation unit 250, the DES computation unit 251 and the SHA 1 computation unit 252.

The arbitration unit 240 outputs the input stream outputted from the stream analysis unit 230, 231, 232, or 233 to the computation unit 250, 251 or 252 which corresponds to the algorithm included in the context.

The computation units 250, 251 and 252 perform cryptographic computation according to the mode included in the context for the input stream.

The input stream includes, from the top, a header which is not to be cryptographically computed, a payload which is to be cryptographically computed, and a footer which is not to be cryptographically computed.

The header length, the payload length and the footer length which are included in the context are respectively the lengths of header, payload, and footer included in the input stream. The header length, the payload length and the footer length included in the context are respectively information indicating the areas in which cryptographic computation is performed among the data included in the stream.

Here, the context ID, the header length, the payload length and the footer length are the context to be held in the stream analysis units 230, 231, 232, and 233 among the information included in the context storage table 213.

The stream analysis units 230, 231, 232, and 233 divide the stream from the header, the payload and the footer based on the header length, the payload length and the footer length included in the context being held, and determine the payload as the target data. Here, the context referred to by the stream analysis units 230, 231, 232 and 233 is a context having the context ID corresponding to the stream ID of the input stream in the context correspondence table 212.

Note that in the case where the stream length is longer than the total of the header length, the payload length, and the footer length, the stream analysis units 230, 231, 232 and 233 divides the long part into the header, the payload, and the footer in order and determines the payload.

For example, in the case where the stream length of the input stream is 512 bytes and the context used for the computation of the input stream has the setting with the header length of 32 bytes, the payload length of 128 bytes, and the footer length of 96 bytes, the stream analysis units 230, 231, 232 and 233 identifies the first 32 bytes of the stream as the header, the next 128 bytes as the payload, the next 96 bytes as the footer, the next 32 bytes as the header, the next 128 bytes as the payload, and the next 96 bytes as the footer.

The fraction output flag included in the context is a flag which defines processing method for fraction payload which is the payload at the end of the input not fulfilling the computation unit in the case where the input of stream from the external devices 201 and 202 is cut off in the middle of the stream and the payload length of the payload inputted before the cutoff is not an integral multiple of the encryption algorithm to be applied.

The computation units 250, 251 and 252 output the fraction payload to the external devices 201 and 202 or to the context storage unit 211 based on the fraction output flag included in the context.

In the case where the fraction output flag is on, the computation units 250, 251, and 252 output the payloads which cryptographic computation is not performed since they are not sufficient for a computation unit, to the external device 201 or 202 via the arbitration unit 240, the stream analysis unit 230, 231, 232 or 233, or the stream control unit 220 or 221. In this case, in order to resume the processing, the external devices 201 and 202 when inputting the rest of the stream, the fraction payload which is outputted once has to be connected to the start of the stream and inputted to the confidential information processing device 200.

In the case where the fraction output flag is off, the computation units 250, 251 and 252 outputs the fraction data to the context storage unit 211. The fraction payload outputted from the computation units 250, 251 and 252 is saved to the context storage unit 211 via the context control unit 210. The context storage unit 211 stores the fraction payload as intermediate information included in the context.

In the case where the subsequent stream is inputted from the external device 201 or 202, the computation units 250, 251 and 252 read the fraction data stored in the context storage unit 211 via the context control unit 210. The computation units 250, 251 and 252 perform cryptographic computation of the data including the fraction payload when performing cryptographic computation for the subsequent stream.

As described above, in the case where the fraction output flag is off, the computation units 250, 251 and 252 connect the fraction data to the start of the payload of the subsequent stream and perform cryptographic computation. In other words, the fraction payload is automatically processed in the confidential information processing device 200. With this, the external devices 201 and 202 does not have to perform processing such as connecting the fraction payload which is once outputted to the start of the stream. In other words, by using the confidential information processing device 200, the amount of processing in the external device 201 and 202 can be reduced. More specifically, the confidential information processing device 200 according to the embodiment of the present invention can process the fraction data with a simple software control.

Normally, in the secret key encryption computation and the hash computation, each payload is considered as a unit of a successive computation. For example, for the secret key cryptographic computation, computation in the CBC mode and others is performed for each payload. In addition, in the hash computation, a hash value is calculated for each payload. However, there is a case where multiple payloads which are divided and dispersed by the header and footer are computed as a long payload.

The number of successive payloads included in the context is for computing multiple payloads which are dispersed as one long payload. The number of successive payloads is information which indicates whether or not the data in separated areas in a stream is cryptographically computed or not as one data. For example, in the case where the number of successive payloads is no less than 2, two or more payloads are cryptographically computed as one long payload. In addition, the number of successive payloads is information which indicates the number of payloads are cryptographically computed as a payload.

The computation units 250, 251 and 252 perform cryptographic computation for data in separate areas of the stream as a piece of data in the case where the number of successive payloads is no less than 2. The computation units 250, 251 and 252 perform cryptographic computation for data in the number of areas shown in the number of successive payloads as a piece of data.

In other words, the computation units 250, 251 and 252 perform cryptographic computation from the start of the input stream based on multiple payloads, a number of which designated by the number of successive payloads, as unit of cryptographic computation.

For example, in the case where the stream length of the input stream is 1024 bytes and the context used for the computation of the input stream has the setting with the header length of 32 bytes, the payload length of 128 bytes, the footer length of 96 bytes, and the number of successive payloads is two, the computation units 250, 251 and 252 perform cryptographic computation for the 256 bytes of data which is the sum of the 128 bytes of data which starts at the 33rd byte from the start of the input stream, and another 128 bytes which starts at the 289th byte from the start of the input stream as a piece of data. Furthermore, the computation units 250, 251 and 252 perform cryptographic computation for the 256 bytes data which is the sum of the 128 bytes data which starts at the 545th byte from the start of the stream, and the 128 bytes data which is at the 801st byte from the start.

The stream non-output flag included in the context is a flag for setting that the output stream is not to be outputted to the external device 201 and 202. In the case where the stream non-output flag is off, the stream control units 220 and 221 outputs the output stream to the external devices 201 and 202. In the case where the stream non-output flag is on, the stream control units 220 and 221 do not output the output stream to the external devices 201 and 202. For example, in the case where only hash computation is performed for the stream, the stream non-output flag is set to be on.

The hash value replacement position included in the context is information indicating a predetermined position of data included in the input stream. The computation units 250, 251 and 252 replace the data at the predetermined position indicated in the hash value replacement position corresponding to the stream to a hash value or a MAC value.

More specifically, when the AES computation unit 250 and the DES computation unit 251 execute the authentication mode and the confidential mode with authentication for the input stream, the data at the predetermined position of the input stream indicated in the hash value replacement position to the MAC value which is the computation result, and output the value to the arbitration unit 240 as the output stream.

In addition, when the SHA 1 computation unit 252 performs the hash computation for the input stream, the data at the predetermined position in the input stream indicated in the hash value replacement position to a hash value or a MAC value which is the computation result, and outputs the value to the arbitration unit 240 as an output stream.

For example, when the algorithm is SHA 1, and the hash value replacement position is 200, the SHA 1 computation unit 252 replaces the 20 bytes data which starts at the 200th byte from the start of stream to the hash value which is the computation result of SHA 1. Note that when the hash value replacement position is 0, the computation units 250, 251 and 252 do not replace the hash value or the MAC value, and output the value to the context control unit 210. The context control unit 210 stores a hash value and a MAC value outputted from the computation units 250, 251 and 252 as a context.

For example, when a hash computation using SHA 1 for the input stream is performed, by setting the stream non-output flag as being on, and the hash value replacement position as 0, the confidential information processing device 200 stores the hash value which is the computation result to the context storage unit 211 and does not output the input stream (output stream) to the external device 201 and 202.

The hash value comparison position included in the context is information indicating a predetermined position of data included in the input stream. The computation units 250, 251 and 252 determine whether or not the data at the predetermined position indicated in the hash value comparison position corresponding to the input stream matches a hash value or a MAC value which is the computation result. In addition, the determination result by the computation units 250, 251 and 252 is outputted to the external device 201 and 202.

More specifically, when the authentication mode and the confidential mode with authentication is executed for the input stream, the AES computation unit 250 and the DES computation unit 251 compare the data at the predetermined position of the input stream indicated in the hash value comparison position to the MAC value which is the computation result, and output the comparison result to the external device 201 or 202.

In addition, the SHA 1 computation unit 252 performs a hash computation for the input stream, the SHA 1 computation unit 252 compares data at the predetermined position of the input stream indicated in the hash value comparison position to the hash value or the MAC value which is the computation result, and outputs the comparison result to the external device 201 or 202.

For example, in the case where SHA 1 is set for the algorithm, 0 for the header length, 200 for the payload length, 50 for the footer length, and 200 for the hash value comparison position, the SHA 1 computation unit 252 compares the hash value which is the computation result for the 200 bytes in the payload part and 20 bytes which is the length of the hash value of SHA 1 which starts at the 200th byte from the start of the stream. With this, the confidential information processing device 200 can detect falsification at the same time of the computation when an expectation value of the hush value is included in the stream. Note that the computation units 250, 251 and 252 do not perform comparison when the hash value comparison position is 0.

The key and the initial value included in the context are a key and an initial value which are necessary depending on the algorithm and the mode. The key and the initial value included in the context are a key and an initial value appropriately set depending on the algorithm and the mode.

The intermediate information included in the context is intermediate computation results, payloads not fulfilling a computation unit (fraction payload) and other internal status and the like.

The hash value included in the context is a hash value or a MAC value generated by the computation units 250, 251 and 252.

The content of the context storage table 213 is set in advance from the external device 202 prior to the input of the input stream except for the intermediate information and the hash value.

Note that in the context storage table 213, appropriate values for computation are stored for the keys, the initial values, the intermediate values and the hash values shown in " . . . ".

In addition, the contexts 260, 261 and 262 held by the computation units 250, 251 and 252, include modes, fraction output flags, the number of successive payloads, hash value replacement positions, hash value comparison positions, keys and initial values, intermediate information, and hash values out of the contexts included in the context storage table 213.

Next, the operation of the confidential information processing device 200 is described.

Figure 7:
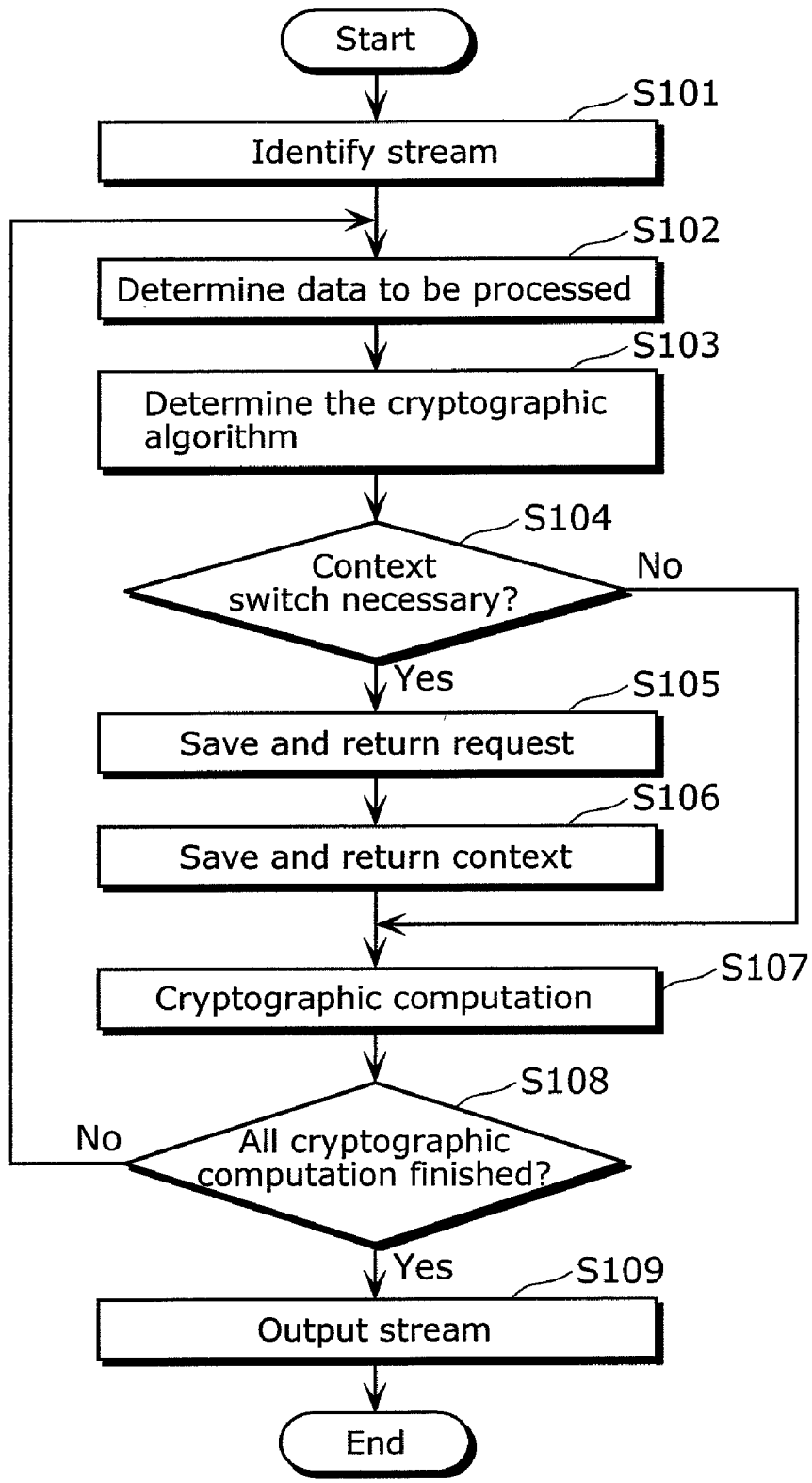
FIG. 7 shows a flowchart indicating a workflow of the confidential information processing device according to the embodiment of the present invention.

FIG. 7 shows a flowchart indicating a workflow of cryptographic computation processing by the confidential information processing device 200. Note that the example describes the case where the stream is inputted to the confidential information processing device 200 from the external device 201.

As shown in FIG. 7, the stream control unit 220 identifies the inputted stream (hereinafter referred to as "the first stream") (S101). More specifically, the stream control unit 220 acquires the stream ID of the first stream. For example, the stream control unit 220 acquires the stream ID by referring to the stream ID included in the first stream. The stream control unit 220 refers to the context correspondence table 212 and determines the number of cryptographic computation for the stream ID of the first stream and the context IDs to be used for each of the cryptographic computations. Afterwards, the stream control unit 220 outputs the first stream to the stream analysis unit 230.

In addition, the stream control unit 220 sends requests for saving/restoring the context to the context control unit 210 when the stream analysis units 230 does not hold the context corresponding to the first stream. The context control unit 210 which receives the request from the stream control unit 220, saves the context held in the stream analysis unit 230 to the context storage unit 211, and restores the context which corresponds to the first stream out of the contexts stored in the context storage unit 211 to the stream analysis unit 230. For example, the stream control unit 220 sends the request for saving/restoring the context when the context ID included in the context held in the stream analysis unit 230 and the context ID which is determined to correspond to the first stream do not match. In addition, the context control unit 210 determines the context to be written on the stream analysis unit 230 by referring to the context ID included in the saving/restoring request.

Next, the stream analysis unit 230 determines the payload from the first stream as the target data (hereinafter referred to as "the first target data") using the header length, the payload length and the footer length included in the context used for the first cryptographic computation by referring to the context being held (S102). Next, the stream analysis unit 230 outputs the first stream to the arbitration unit 240.

Next, the arbitration unit 240 determines the cryptographic algorithm of the cryptographic computation for the first stream by referring to the context storage table 213 (S103). The arbitration unit 240 outputs the first stream to the computation unit 250, 251 or 252 which corresponds to the determined cryptographic algorithm. Here, the first stream is outputted to the AES computation unit 250.

In addition, the arbitration unit 240 determines which input streams from the stream analysis units 230, 231, 232, and 233 is processed when the input streams which are to be processed in the same computation unit 250, 251 or 252 are inputted.

The arbitration unit 240 determines whether or not the context 260 held in the AES computation unit 250 needs to be switched (S104). More specifically, the arbitration unit 240 determines whether or not the context to be used for the cryptographic computation for the first stream is held by the AES computation unit 250. For example, the arbitration unit 240 determines that it is not necessary to switch the context when the context ID of the context used for the cryptographic computation of the first stream and the context ID of the context 260 matches (No in S104), and that it is necessary to switch the context when the contexts do not match (Yes in S104).

When it is necessary to switch the context (Yes in S104), the arbitration unit 240 sends a request for saving and restoring the context 260 to the context control unit 210 (S105). The context control unit 210 which receives the request for restoring and saving the context saves and restores context (S106). More specifically, the context control unit 210 saves the context 260 held in the AES computation unit 250 to the context storage unit 211. Next, the context control unit 210 writes the context used for the cryptographic computation of the first stream which is to be stored in the context storage unit 211 to the AES computation unit 250.

After the context 260 is saved and restored, or when it is not necessary to switch the context (No in S104), next, the AES computation unit 250 performs the cryptographic computation in the mode specified by the context 260 to the first target data determined in step S102 (S107). Here, the AES computation unit 250 performs cryptographic computation using the key, the initial value, and the intermediate information and others included in the context 260.

The AES computation unit 250 outputs the cryptographically computed first stream (hereinafter referred to as "the second stream") to the arbitration unit 240. The arbitration unit 240 outputs the second stream to the stream analysis unit 230 from which the first stream is outputted. The stream analysis unit 230 outputs the second stream to the stream control unit 220.

With the processing above, the first cryptographic computation is completed.

When only one cryptographic computation is performed for the input stream or when all of the cryptographic computation set on the context correspondence table 212 is finished (Yes in S108), the stream control unit 220 outputs the second stream to the external device 201 (S109).

On the other hand, when two cryptographic computations are performed for the input stream and all of the cryptographic computations are not performed (No in S108), the stream control unit 220 outputs the second stream to an other stream analysis unit 231. In addition, the stream control unit 220 sends, in the same manner as shown in the first processing, requests for saving/restoring the context to the context control unit 210 when the stream analysis units 231 does not hold the context corresponding to the second stream.

The stream analysis unit 231 determines the payload from the second stream as the target data (hereinafter referred to as "the second target data") using the header length, the payload length and the footer length included in the context used for the second cryptographic computation by referring to the context being held. Next, the stream analysis unit 231 outputs the second stream to the arbitration unit 240.

Next, the arbitration unit 240 determines the cryptographic algorithm of the cryptographic computation for the second stream by referring to the context storage table 213 (S103). The arbitration unit 240 outputs the second stream to the computation unit 250, 251 or 252 which corresponds to the determined cryptographic algorithm. Here, the second stream is outputted to the SHA 1 computation unit 252.

Note that the processing from steps S104 to S107 is the same as the processing for the first cryptographic computation described above, and description is omitted.

The SHA 1 computation unit 252 outputs the cryptographically computed second stream (hereinafter referred to as "the third stream") to the arbitration unit 240. The arbitration unit 240 outputs the third stream to the stream analysis unit 231 from which the second stream is outputted. The stream analysis unit 230 outputs the third stream to the stream control unit 220.

With the processing above, the second cryptographic computation is completed.

When two cryptographic computations are set on the context correspondence table 212, since two cryptographic computations are completed (Yes in S108), the stream control unit 220 outputs the third stream to the external device 201 (S109).

Note that the processing in the case where a stream is inputted from the external device 202 is the same as shown in FIG. 7.

In addition, in FIG. 7, processing such as saving and restoring the context for the second cryptographic computation is performed after the first cryptographic computation is finished, when different computation units 250, 251 and 252 are used for the first cryptographic computation and the second cryptographic computation, the processing for saving and restoring the context for the second cryptographic computation may be performed before the first cryptographic computation is finished.

A specific computation example by the confidential information processing device 200 is described hereafter.

First of all, an example in which two convergent streams are inputted is described as the first computation example. More specifically, the two streams with the stream ID "0" and the stream ID "1" are inputted via the external device 201.

The length of each of the streams with the stream ID "0" and the stream ID "1" is 256 bytes. The cryptographic computation processing for the stream ID "0" and the stream ID "1" is performed by time division processing in an order from the first 128 bytes of the stream ID "0", the first 128 bytes of the stream ID "1", the last 128 bytes of the stream ID "0", and the last 128 bytes of the stream ID "1".

As shown in FIG. 4, the cryptographic computation using the context with the context ID "0" is performed for the stream with the stream ID "0", the cryptographic computation using the context with the context ID "1".

In addition, as shown in FIG. 6, the context with the context ID "0", CBC decrypting using AES, 7 bytes for the header length, 240 bytes for the payload length, 9 bytes for the footer length, on for the fraction output flag, 1 for the number of successive payloads, and off for the stream non-output flag are set from the external device 202 in advance.

In addition, as shown in FIG. 6, the context with the context ID "1", HMAC-SHA 1, 5 bytes for the header length, 251 bytes for the payload length, 0 byte for the footer length, off for the fraction output flag, 1 for the number of successive payload, on for the stream non-output flag, 0 for the hash value replacement position, and 0 for the hash value comparison position are set from the external device 202 in advance.

Figure 8:
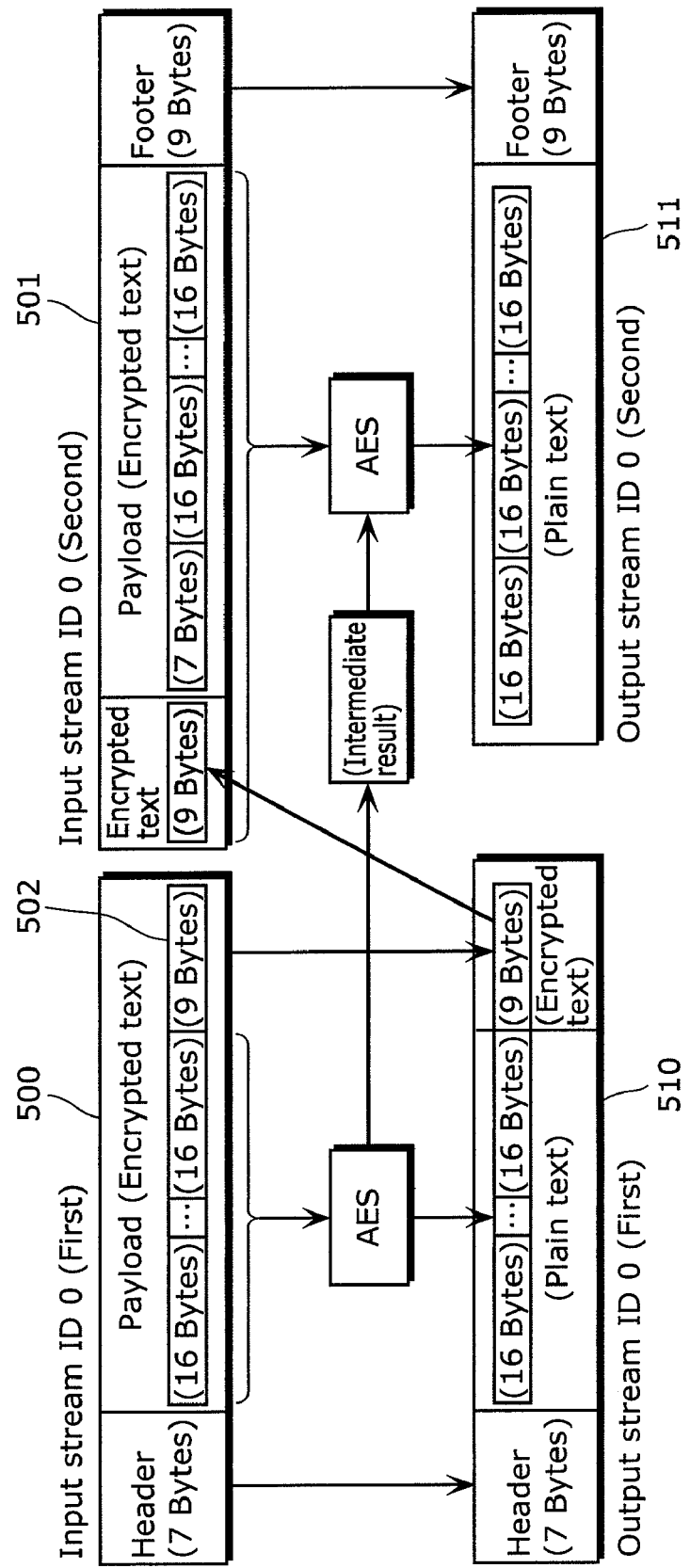
FIG. 8 shows stream processing of the stream with the stream ID "0" in the first computation example by the confidential information processing device according to the embodiment of the present invention.
Figure 9:
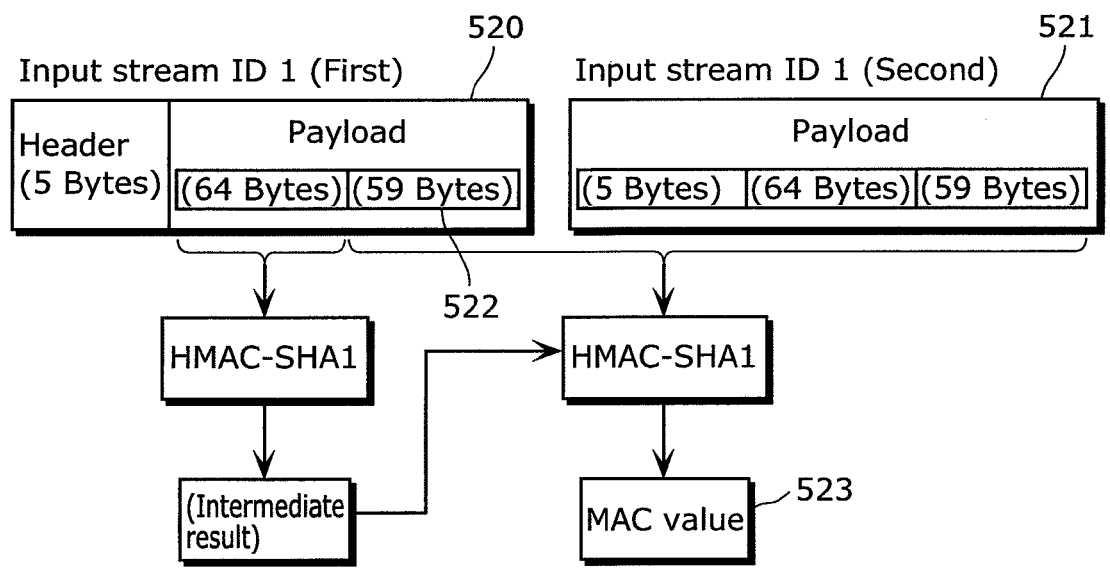
FIG. 9 shows stream processing of the stream with the stream ID "1" in the first computation example by the confidential information processing device according to the embodiment of the present invention.

FIG. 8 shows stream processing of the stream with the stream ID "0" in the first computation example by the confidential information processing device 200. FIG. 9 shows processing of the stream with the stream ID "0" in the first computation example by the confidential information processing device 200.

The confidential information processing device 200 divides the stream with the stream ID "0" into the first half of the stream which is referred to as the stream 500 and the latter half of the stream referred to as the stream 501 in order to process the stream. In addition, the confidential information processing device 200 divides the stream with the stream ID "1" into the first half of the stream which is referred to as the stream 520 and the latter half of the stream referred to as the stream 521 in order to process the stream.

The confidential information processing device 200 first processes the stream 500 which is the first half of the stream ID "0".

When input of the stream from the external device 201 to the stream control unit 220 starts, the stream control unit 220 refers to the context correspondence table 212 stored in the context storage unit 211 and confirms that one cryptographic computation is performed using the context with the context "0" is performed for the stream ID "0". With this, the stream control unit 220 the stream control unit 220 outputs the stream with the stream ID "0" to the stream analysis unit 230, and controls the internal path to output the cryptographically computed stream with the stream ID "0" outputted from the stream analysis unit 230 to the external device 201.

In addition, the stream control unit 220 sends requests for saving and restoring the context to the context control unit 210 for the stream analysis unit 230. The context control unit 210 which received the request saves the context held in the stream analysis unit 230, and restores the context with the context ID "0" to the stream analysis unit 230.

When the context corresponding to the context ID "0" is held in the stream analysis unit 230, the stream control unit 220 starts input of the stream with the stream ID "0" to the stream analysis unit 230.

The stream analysis unit 230 identifies the target data for the stream with the stream ID "0" according to the context being held. The stream analysis unit 230 outputs information for identifying the target data and the stream with the stream ID "0" to the arbitration unit 240.

The arbitration unit 240 confirms that an AES computation is performed for a stream according to the algorithm included in the context which corresponds to the stream ID "0" in the context storage table 213. The arbitration unit 240 sends a request for saving and restoring the context 260 held in the AES computation unit 250 to the context control unit 210.

When the context 260 which corresponds to the context ID "0" is held in the AES computation unit 250, the arbitration unit 240 starts inputting the stream to the AES computation unit 250.

The AES computation unit 250 outputs the 7 bytes header part to the arbitration unit 240 without computation. The payload parts are cryptographically computed sequentially and outputted to the arbitration unit 240.

The AES computation result inputted to the arbitration unit 240 is outputted to the external device 201 via the stream analysis unit 230 and the stream control unit 220.

Here, the stream 500 includes 121 bytes of payload. Since the computation unit of AES is 16 bytes, the last 9 bytes which is the reminder of 121 bytes divided by 16 is the fraction payload 502 not fulfilling a computation unit.

In the context ID "0", since the fraction output flag is on, the stream analysis unit 230 outputs the fraction payload 502 to the external device 201 via the stream control unit 220.

Therefore, the stream 510 outputted to the external device 201 is 128 bytes in total, including the header of 7 bytes, 112 bytes which is the AES computation result among the payload, 9 bytes of the fraction payload.

Next, as shown in FIG. 9, the confidential information processing device 200 processes the stream 520 which is the first half of the stream with the stream ID "1". The stream with the stream ID "1" inputted from the external device 201 is inputted to the SHA 1 computation unit 252 via the stream control unit 220, the stream analysis unit 231 and the arbitration unit 240. In addition, in the same manner as the processing for the stream 500 with the stream ID of "0", the contexts held in the stream analysis unit 231 and the SHA 1 computation unit 252 are saved and restored.

Although the stream 520 includes 123 bytes of payload, computation unit of SHA is 64 bytes, the last 59 bytes which is the reminder of 123 bytes divided by 64 is the fraction payload 522 not fulfilling the computation unit.

Since the fraction output flag included in the context having the context ID "1" is off, the SHA 1 computation unit 252 saves the fraction payload 522 to the context storage unit 211 as a context.

In addition, the stream non-output flag included in the context with the context ID "1" is on, the stream control unit 220 does not output a stream to the external device 202.

Next, the confidential information processing device 200 processes the stream 501 which is the latter half of the stream with the stream ID "0".

Here, since the fraction payload 502 is outputted to outside the confidential information processing device 200 when processing the stream 500, the external device 201 has to input the total of 137 bytes, the fraction payload 502 connected to the start of the stream 501.

The confidential information processing device 200 performs the AES computation to the inputted stream as necessary, and outputs a stream with the 128 bytes of the computation result and the 9 bytes of footer to the external device 201.

Finally, the confidential information processing device 200 processes the stream 521 which is the latter half of the stream with the stream ID "1".

When the stream 520 is processed, the fraction payload 522 is saved as the context. Thus, when processing the stream 521, the SHA 1 computation unit 252 connects the fraction payload 522 and the stream 521. More specifically, since the processing for the fraction payload 522 is performed in the confidential information processing device 200, the external device 201 does not have to process the fraction payload 522.

The MAC value 523 which is the computation results for the payload of 251 using HMAC-SHA 1 is saved to the context storage unit 211, and stored as a hash value included in the context ID "1". With this, the external device 202 can read the hash value stored in the context storage unit 211.

As described above, the confidential information processing device 200 can perform different cryptographic computations for two convergent streams.

Next, an example in which two cryptographic computations are performed for one stream. More specifically, HMAC-SHA 1 computation is performed as the first cryptographic computation, and the MAC value generated in the computation is incorporated into the stream. The AES encryption is performed as the second cryptographic computation.

The stream with the stream ID "2" is inputted via the external device 201. The length of the stream with the stream ID "2" is 256 bytes. The cryptographic computation processing for the stream with the stream ID "2" is performed twice, with the stream divided into the first 128 bytes and the last 128 bytes and processed in two times.

As shown in FIG. 4, the stream with the stream ID "2", the first cryptographic computation using the context with the context ID "2", and the second cryptographic computation is performed on the stream on which the first cryptographic computation is performed, using the context with the context ID "3".

In addition, as shown in FIG. 6, the context with the context ID "2", HMAC-SHA 1, 4 bytes for the header length, 196 bytes for the payload length, 56 bytes for the footer length, off for the fraction output flag, 1 for the number of successive payload, off for the stream non-output flag, 201 for the hash value replacement position, and 0 for the hash value comparison position are set from the external device 202 in advance.

In addition, the context with the context ID "3", CBC encryption using the AES, 32 bytes for the header length, 224 bytes for the payload length, 0 byte for the footer length, off for the fraction output flag, 1 for the successive payload, and off for the stream non-output flag is set from the external device 202 in advance.

Figure 10:
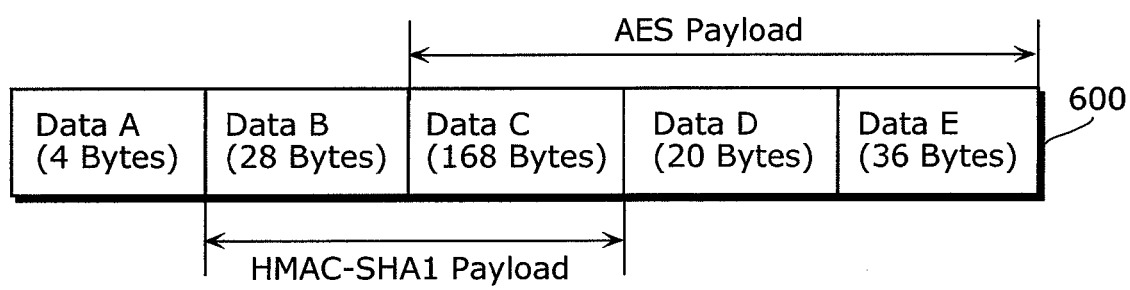
FIG. 10 shows stream configuration of the stream in the second computation example by the confidential information processing device according to the embodiment of the present invention.
Figure 11:
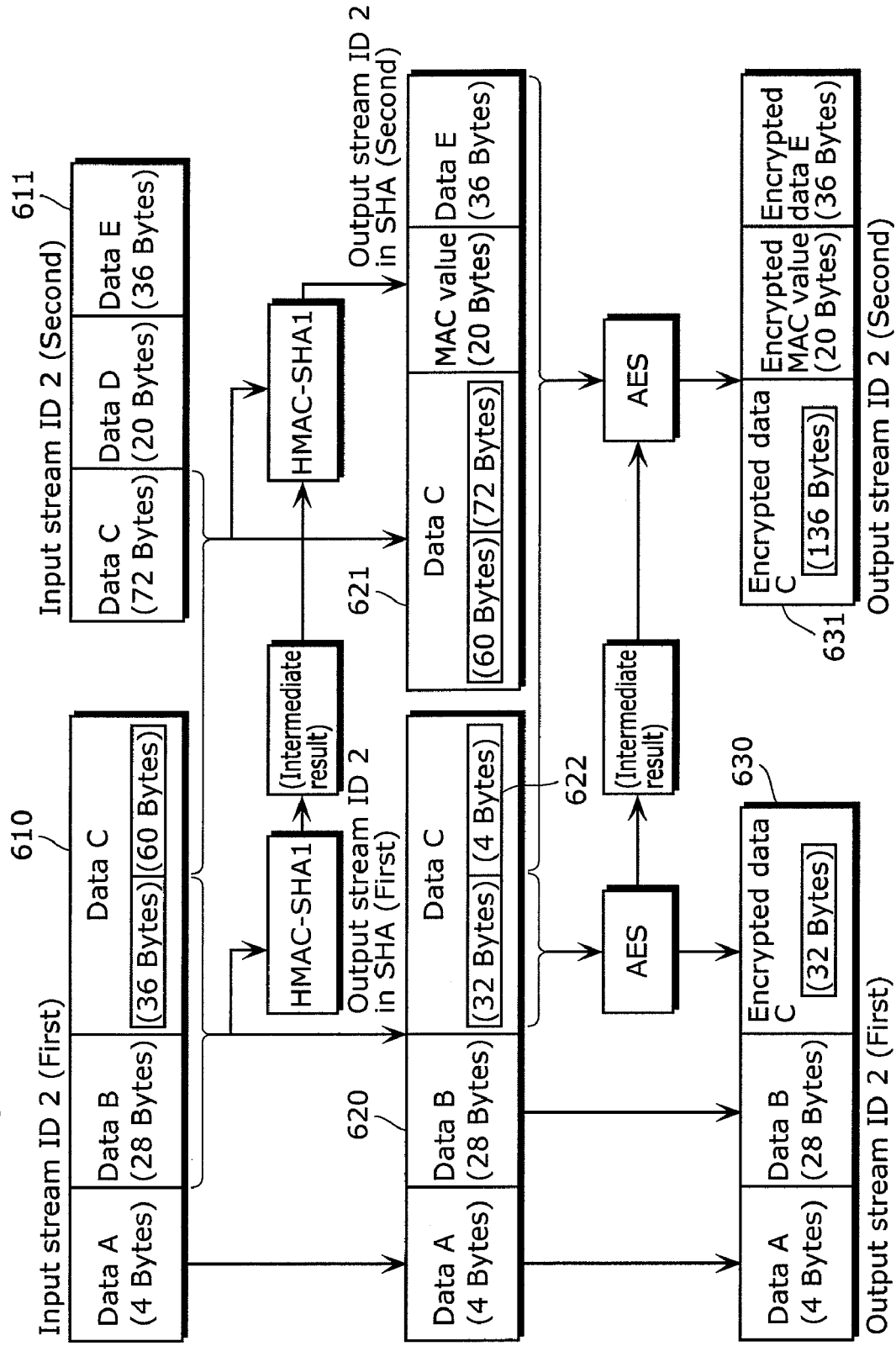
FIG. 11 is a diagram showing stream processing in the second computation example by the confidential information processing device according to the embodiment of the present invention.

FIG. 10 shows configuration of the stream in the second computation example by the confidential information processing device 200. FIG. 11 shows processing of the stream in the second computation example by the confidential information processing device 200.

The stream 600 shown in FIG. 10 is a stream of 256 bytes inputted to the confidential information processing device 200 from the external device 201. In the HMAC-SHA 1 computation, in the stream 600, data A is the header, data B and data C combined is the payload, data D and data E combined is the footer. In the AES computation, in the stream 600, data A and data B combined is the header, data C, data D and data E combined is the payload.

The process order will be described focusing on the difference from the first computation example, and the overlapping descriptions are omitted.

First of all, the processing for the stream 610, which is the first half of the stream with the stream ID "2".

The stream control unit 220 refers to the context correspondence table 212 and confirms the first cryptographic computation using the context with the context ID "2" for the stream ID "2" and the second cryptographic computation using the context with the context ID "3" are performed. With this, the stream control unit 220 controls the internal paths so that the stream with the stream ID "2" is outputted to the stream analysis unit 230, the stream on which the first cryptographic computation is performed that is outputted from the stream analysis unit 230 is outputted to the stream analysis unit 231, and the stream on which the second cryptographic computation is performed that is outputted from the stream analysis unit 231 is outputted to the external device 201.

The stream analysis units 230 identifies the data B and the data C as the target data for HMAC-SHA 1 computation by referring to the header length, the payload length, and the footer length included in the context with the context ID "2".

The SHA 1 computation unit 252 performs computation for the 64 bytes which is an integral multiplication of the unit of computation out of the 124 bytes, the total of the data B which is the payload and data C. More specifically, the SHA 1 computation unit 252 performs the HMAC-SHA 1 computation for the 64 bytes which includes data B and 36 bytes from the start of data C.

The SHA 1 computation unit 252 stores the intermediate result which is the computation result.

The SHA 1 computation unit 252 directly outputs the stream except for the 60 bytes of the fraction payload 612 which does not meet the unit of computation. More specifically, the SHA 1 computation unit 252 outputs the stream 620 in which data A, data B and 36 bytes from the start of data C are combined. In addition, the SHA 1 computation unit 252 saves the fraction payload 612 to the context storage unit 211 as the context with the context ID "2".

The stream 620 is inputted to the stream analysis unit 231 via the arbitration unit 240 and the stream analysis unit 230.

The stream analysis unit 231 identifies the data C as the target data for AES computation by referring to the header length, the payload length, and the footer length included in the context with the context ID "3".

The AES computation unit 250 performs cryptographic computation on the computation target which is 32 bytes from the start of the 36 bytes of data C included in the stream 620. The AES computation unit 250 replaces the target data with the encrypted data C which is the computation result. The AES computation unit 250 outputs the stream 630 which includes the data A, the data B and the encrypted data C.

The stream 630 is outputted to the external device 201 via the arbitration unit 240, the stream analysis unit 231 and the stream control unit 220.

In addition, the AES computation unit 250 saves the fraction payload 622 which is the last 4 bytes of the data C to the context storage unit 211 as the context with the context ID "3".

Next, the processing for the stream 611, which is the latter half of the stream with the stream ID "2" is described.

The stream 611 inputted from the external device 201 is inputted to the SHA 1 computation unit 252 via the stream control unit 220, the stream analysis unit 230 and the arbitration unit 240.

The SHA 1 computation unit 252 connects the fraction payload 612 which is to be stored as the context with the context ID "2" to the start of the stream 611. The SHA 1 computation unit 252 performs the HMAC-SHA 1 computation for the 132 bytes which is to be the payload in the combined data.

In addition, since the hash value replacement position is 201 in the context ID "2", the SHA 1 computation unit 252 replaces the data D which is the 201st byte from the start of the stream with the MAC value which is the computation result of the HMAC-SHA 1. Thus, the SHA 1 computation unit 252 outputs the stream 621 in which 132 bytes from the data C, the MAC value, and the data E are combined.

The stream 621 is inputted to the AES computation unit 250 via the arbitration unit 240, the stream analysis unit 230, the stream control unit 220, the stream analysis unit 231 and the arbitration unit 240.

The AES computation unit 250 connects the fraction payload 622 which is to be stored as the context with the context ID "3" to the start of the stream 621. The AES computation unit 250 performs the AES computation for the 192 bytes of connected data. The AES computation unit 250 outputs the stream 631 in which the encrypted data C which is the AES computation result, the encrypted MAC value, and the encrypted data E are combined.

The stream 631 is outputted to the external device 201 via the arbitration unit 240, the stream analysis unit 231 and the stream control unit 220.

As described above, the confidential information processing device 200 can perform two different cryptographic computations for one stream. In addition, the MAC value which is the computation result can be incorporated into the stream and outputted.

Next, an example in which two cryptographic computations are performed for one stream is described as the third computation example. More specifically, the AES decryption is performed as the first cryptographic computation. The HMAC-SHA 1 computation is performed as the second cryptographic computation. In addition, the MAC value generated by the HMAC-SHA 1 computation and the data in the predetermined area included in the stream are compared.

The stream with the stream ID "3" is inputted via the external device 201. The length of the stream with the stream ID "3" is 256 bytes. In addition, the confidential information processing device 200 performs two cryptographic computations for the first 128 bytes and the latter 128 bytes.

As shown in FIG. 4, the stream with the stream ID "3", the cryptographic computation using the context with the context ID "4" is further performed, and the second cryptographic computation is performed on the stream on which the first cryptographic computation is performed, using the context with the context ID "5".

In addition, as shown in FIG. 6, the context with the context ID "4", CBC decoding using AES, 32 bytes for the header length, 224 bytes for the payload length, 0 byte for the footer length, off for the fraction output flag, 1 for the number of successive payloads, and off for the stream non-output flag are set from the external device 202 in advance.

In addition, the context with the context ID "5", HMAC-SHA1, 4 bytes for the header length, 196 bytes for the payload length, 56 bytes for the footer length, off for the fraction output flag, 1 for the number of successive payload, off for the stream non-output flag, 0 for the hash value replacement position, and 201 for the hash value comparison position are set from the external device 202 in advance.

Figure 12:
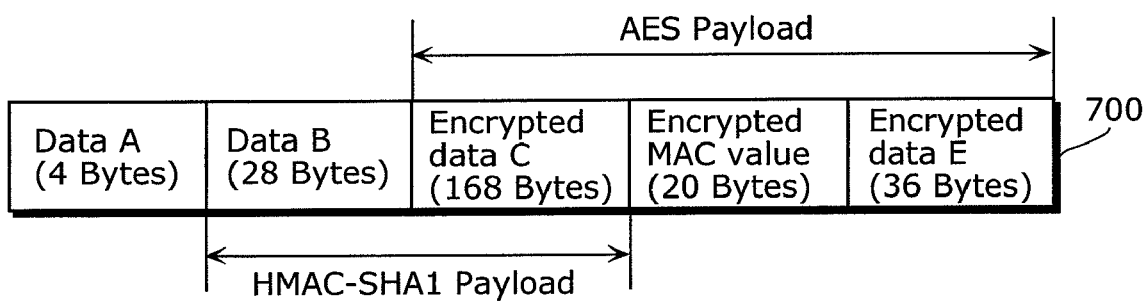
FIG. 12 shows stream configuration of the stream in the third computation example by the confidential information processing device according to the embodiment of the present invention.
Figure 13:
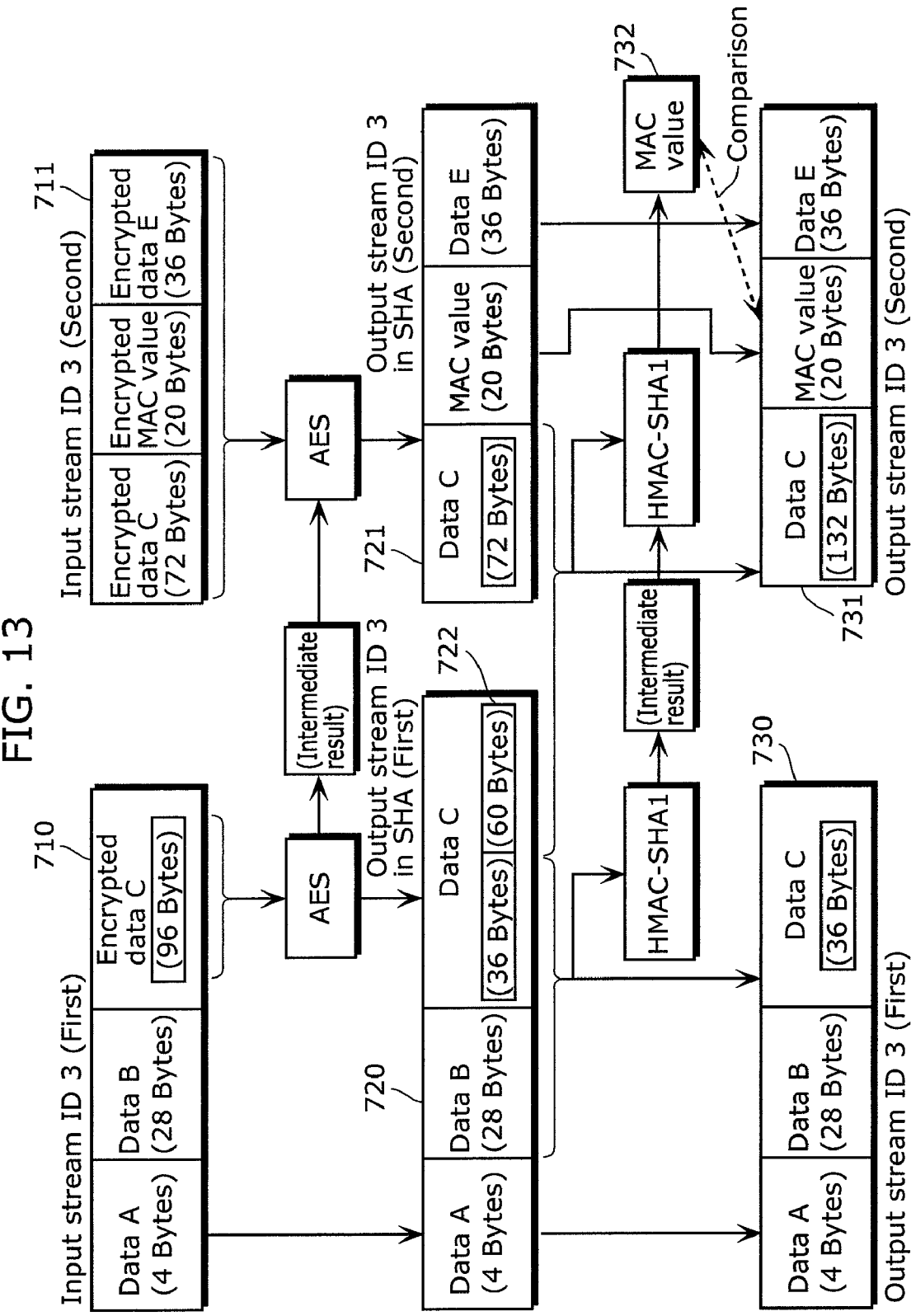
FIG. 13 shows stream processing of the stream in the third computation example by the confidential information processing device according to the embodiment of the present invention.

FIG. 12 shows configuration of the stream in the third computation example by the confidential information processing device 200. FIG. 13 shows processing for the stream in the third computation example by the confidential information processing device 200.

The stream 700 shown in FIG. 12 is a stream of 256 bytes inputted to the confidential information processing device 200 from the external device 201. In the AES computation, in the stream 700, data A and data B combined is the header, and the data in which data C, data D and data E are combined is the payload. In the HMAC-SHA 1 computation, in the stream 700, data A is the header, data B and encrypted data C combined is the payload, and encrypted MAC value and encrypted data E combined is the footer.

The process order will be described focusing on the difference from the first and second computation examples, while the overlapping descriptions are omitted.

First of all, the processing for the stream 710, which is the first half of the stream with the stream ID "3".

The stream 710 inputted from the external device 201 is inputted to the AES computation unit 250 via the stream control unit 220, the stream analysis unit 230 and the arbitration unit 240.

The AES computation unit 250 encrypts the 96 bytes included in the stream 710 among the encrypted data C. The AES computation unit 250 replaces the encrypted data C with the decrypted data C and outputs the stream 720.

The stream 720 is inputted to the SHA 1 computation unit 252 via the arbitration unit 240, the stream analysis unit 230, the stream control unit 220, the stream analysis unit 231 and the arbitration unit 240.

The SHA 1 computation unit 252 performs computation on the 64 bytes which includes data B and 36 bytes from the start of data C out of the 124 bytes, for the total of the data B which is the payload and data C. The SHA 1 computation unit 252 outputs the stream 730 in which data A, data B and 36 bytes from the start of data C are combined.

The SHA 1 computation unit 252 stores the intermediate result which is the computation result. In addition, the SHA 1 computation unit 252 stores the fraction payload 722 which is the last 60 bytes of data C as the context with the context ID "5".

The stream 730 is outputted to the external device 201 via the arbitration unit 240, the stream analysis unit 231 and the stream control unit 220.

Next, the processing for the stream 711, which is the latter half of the stream with the stream ID "3" is described.

The stream 711 inputted from the external device 201 is inputted to the AES computation unit 250 via the stream control unit 220, the stream analysis unit 230 and the arbitration unit 240.

The AES computation unit 250 decrypts the entire stream 711 since all of stream 711 is payload. The AES computation unit 250 outputs the stream 721 which is data C that is the computation result, a MAC value, and data E are combined.

The stream 721 is inputted to the SHA 1 computation unit 252 via the arbitration unit 240, the stream analysis unit 230, the stream control unit 220, the stream analysis unit 231 and the arbitration unit 240.

The SHA 1 computation unit 252 combines the fraction payload 722 at the start of the stream 721. The SHA 1 computation unit 252 performs the HMAC-SHA 1 computation for the 132 bytes in the combined data which is to be the payload, and generates the MAC value 732.

The SHA 1 computation unit 252 outputs the stream 731 in which 132 bytes from the data C, the MAC value, and the data E are combined. The stream 731 is outputted to the external device 201 via the arbitration unit 240, the stream analysis unit 231 and the stream control unit 220.

In addition, since the hash replacement position is 201 in the context ID "5", the SHA 1 computation unit 252 compares the MAC value included in the stream 721 and at the 201st byte from the start of the stream and the MAC value 732. The SHA 1 computation unit 252 saves the comparison result to the context storage unit 211. With this, the external device 202 can confirm the comparison result.

As described above, the confidential information processing device 200 can perform two different cryptographic computations for one stream. In addition, the MAC value which is the computation result and the data at the predetermined area in the stream can be compared.

Next, as the fourth computation example, an example in which two streams are simultaneously inputted is described. In addition, two cryptographic computations are respectively performed on the two streams.

The stream with the stream ID "4" is inputted via the external device 201, and the stream with the stream ID "5" is inputted via the external device 202.

The length of each of the two types of streams with the stream ID "4" and the stream ID "5" is 256 bytes. In addition, the confidential information processing device 200 simultaneously processes the stream ID "4" and the stream ID "5".

As shown in FIG. 4, the stream with the stream ID "4", the first cryptographic computation using the context with the context ID "6" is performed, and the second cryptographic computation is performed for the stream on which the first cryptographic computation is performed, using the context with the context ID "7". The stream with the stream ID "5", the first cryptographic computation using the context with the context ID "8" is performed, and the second cryptographic computation is performed for the stream on which the first cryptographic computation is performed, using the context with the context ID "9".

In addition, as shown in FIG. 6, the context with the context ID "6", CBC decoding using AES, 0 byte for the header length, 128 bytes for the payload length, 0 byte for the footer length, off for the fraction output flag, 1 for the number of successive payloads, and off for the stream non-output flag are set from the external device 202 in advance.

For the context with the context ID "7", CBC decoding using AES, 0 byte for the header length, 128 bytes for the payload length, 0 byte for the footer length, off for the fraction output flag, 1 for the number of successive payloads, and off for the stream non-output flag are set from the external device 202 in advance.

In addition, the context with the context ID "8", HMAC-SHA1, bytes for the header length, 200 bytes for the payload length, 36 bytes for the footer length, off for the fraction output flag, 1 for the number of successive payload, off for the stream non-output flag, 221 for the hash value replacement position, and 0 for the hash value comparison position are set from the external device 202 in advance.

For the context with the context ID "9", CBC decoding using DES, 0 byte for the header length, 128 bytes for the payload length, 128 bytes for the footer length, off for the fraction output flag, 1 for the number of successive payloads, and off for the stream non-output flag are set from the external device 202 in advance.

Here, when different keys are set for the context ID "6" and the context ID "7" from the external device 202, the computation for the stream ID "4" is processing which includes decryption for the stream and encryption using a different key.

The process order will be described focusing on the difference from the first to third computation examples while the overlapping descriptions are omitted.

In the first computation for the stream with the stream ID "4", the stream is inputted to the AES computation unit 250 via the stream control unit 220, the stream analysis unit 230 and the arbitration unit 240. The AES computation unit 250 decrypts the stream. The decrypted stream is inputted to the stream control unit 220 via the arbitration unit 240 and the stream analysis unit 230.

In the second computation for the stream with the stream ID "4", the stream control unit 220 outputs the stream in which the first computation is performed to the AES computation unit 250 via the stream analysis unit 231 and the arbitration unit 240. The AES computation unit 250 encrypts the stream. The encrypted stream is outputted to the external device 201 via the arbitration unit 240 and the stream analysis unit 231.

In the first computation for the stream with the stream ID "5", the stream is inputted to the SHA 1 computation unit 252 via the stream control unit 221, the stream analysis unit 232 and the arbitration unit 240. The SHA 1 computation unit 251 performs first cryptographic computation for the stream. The stream in which the first cryptographic computation is performed is inputted to the stream control unit 221 via the arbitration unit 240 and the stream analysis unit 232.

In the second computation for the stream with the stream ID "5", the stream control unit 221 outputs the stream in which the first computation is performed to the DES computation unit 251 via the stream analysis unit 233 and the arbitration unit 240. The DES computation unit 251 performs the second cryptographic computation for the stream. The stream in which the second cryptographic computation is performed is outputted to the external device 202 via the arbitration unit 240, the stream analysis unit 233 and the stream control unit 221.

Here, the first and second computations on the stream with the stream ID "4" are performed in the AES computation unit 250. Thus, it is necessary to control the computations so that the first computation and the second computation are performed in a time-sharing manner.

In order to control the computation, the arbitration unit 240 checks the computation request from the stream analysis units 230, 231, 232, and 233. The arbitration unit 240 receives the stream analysis unit with higher priority among the stream analysis units 230, 231, 232 and 233 when computation requests using the same algorithm conflict. The arbitration unit 240 requests saving and restoring the context for the received computation request, and processes input/output of the stream. For example, the stream analysis units are put in order of priority from the stream analysis units 233, 232, 231 and 230.

The arbitration unit 240 receives the cryptographically computed output stream after the cryptographic computation corresponding to the computation request received earlier in the appropriate computation unit 250, 251, or 252. The arbitration unit 240 outputs the received input stream to the stream analysis unit 230, 231, 232, or 233. The arbitration unit 240 checks the computation request again, after the arbitration unit 240 finish outputting the output stream to the stream analysis unit, and performs processing in the same manner as described above.

Therefore, in the computation on the stream with the stream ID "4", the AES computation unit 250 first performs a computation using the context ID "6". The computation result is stored in the buffer 302, in the stream control unit 220.

Since the priority of the stream analysis unit 231 is higher than that of stream analysis unit 230, the arbitration order is modified when the stream stored in the buffer 302 is inputted to the arbitration unit 240 via the stream analysis unit 231. Thus, the arbitration unit 240 sends a request for saving and restoring the context to the AES computation unit 250 to the context control unit 210. With this, the context with the context ID "7" is stored in the AES computation unit 250.

The AES computation unit 250 performs computation using the context ID "7".

As described above, save and restore of the contexts with the context ID "6" and the context ID "7" are performed several times to/from the AES computation unit 250, and the computation for the whole stream is completed.

Here, by including the buffer 302 in the stream analysis unit 221, processing request from the stream analysis unit 231 to the arbitration unit 240 can be performed in sizable data units. Therefore, the confidential information processing device 200 can decrease the number of save and restore of context to and from the AES computation unit 250.

In addition, the priority of the stream analysis unit 231 used for the second computation is set to be higher than that of the stream analysis unit 230 used for the first cryptographic computation. With this, the stream to which the first cryptographic computation is finished is cryptographically computed with higher priority. More specifically, the stream stored in the buffer 302 is cryptographically computed preferentially, and outputted to the external device 201. With this, the data amount of the stream stored in the buffer 302 can be reduced. To put it differently, the amount of the buffer 302 can be reduced.

Note that the computation for the stream with the stream ID "5" is computation using HMAC-SHA 1 and DES. More specifically, in the computation for the stream with the stream ID "5", an algorithm different from the algorithm used for the stream with the stream ID "4" is used. Thus, save and restore of the context to/from the DES computation unit 251 and the SHA computation unit 252 are performed only once.

In addition, the context with the context ID "8", off for the stream non-output flag, 221 for the hash value replacement position are set. The SHA 1 computation unit 252 replaces the 20 bytes which starts at the 221st byte from the start of the stream inputted from the external device 202 with the hash value which is the computation result of the payload of the stream by the HMAC-SHA1 computation. In addition, the DES computation unit 251 replaces the 128 bytes from the start of the replaced stream with the result of DES computation and outputs the stream. The stream outputted from the DES computation unit 251 is outputted to the external device 201.

As described above, the confidential information processing device 200 can perform two cryptographic computations for the two streams which are simultaneously inputted. In addition, even when the same computation unit is used for the first cryptographic computation and the second cryptographic computation, two cryptographic computations can be performed with one stream input.

Next, an example in which cryptographic computation is performed for data in separate areas in the stream as one data is described as the fifth computation example.

The stream with the stream ID "6" is inputted via the external device 201. The length of the stream with the stream ID "6" is 512 bytes. In addition, the entire stream with the stream ID "6" is processed at one time without processing another stream during the processing.

As shown in FIG. 4, cryptographic computation for the stream with the stream ID "6" is performed using the context with the context ID "10".

In addition, as shown in FIG. 6, the context with the context ID "10", HMAC-SHA 1 computation, 32 bytes for the header length, 128 bytes for the payload length, 96 bytes for the footer length, off for the fraction output flag, 2 for the number of successive payloads, and on for the stream non-output flag are set from the external device 202 in advance.

Figure 14:
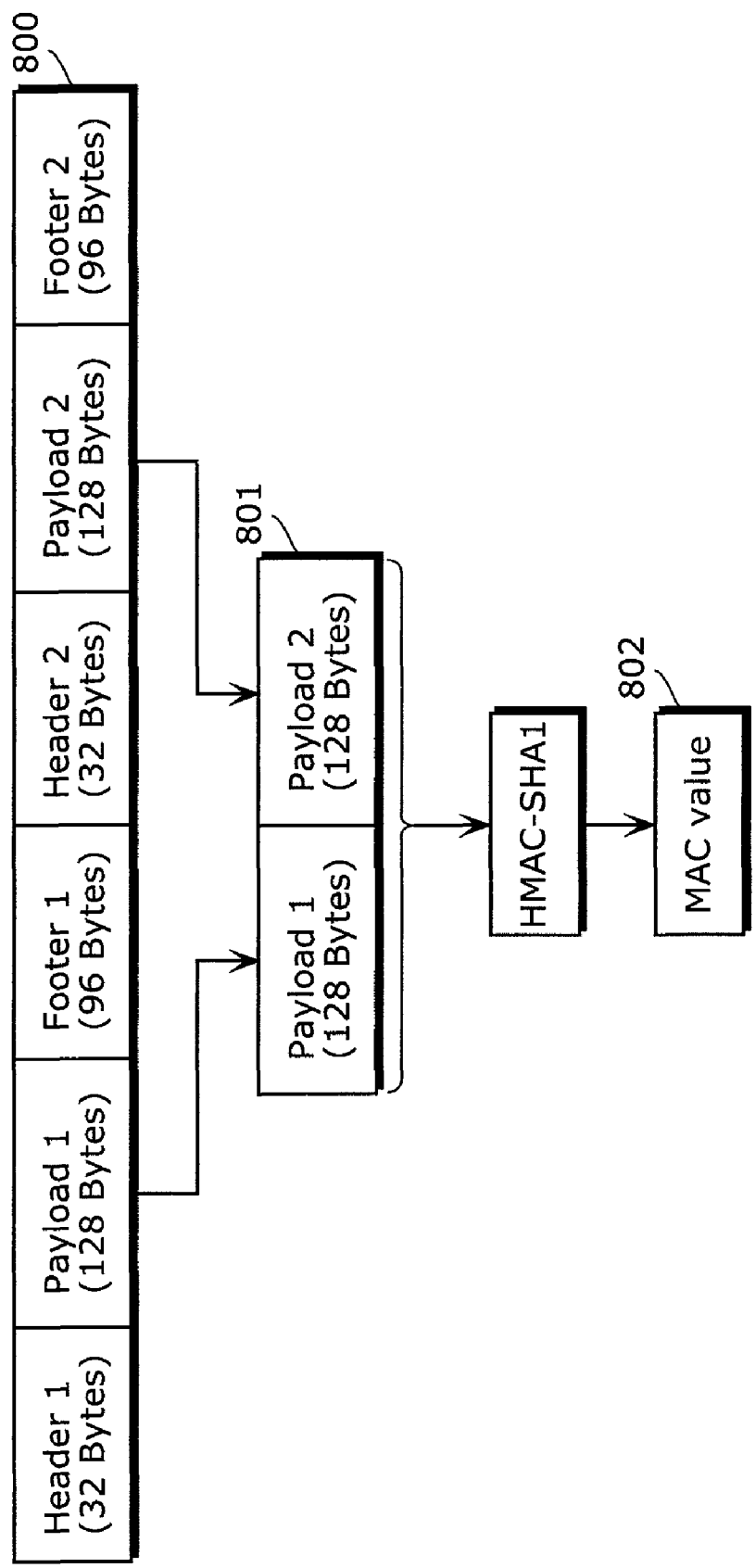
FIG. 14 is a diagram showing stream processing in the fifth computation example by the confidential information processing device according to the embodiment of the present invention.

FIG. 14 shows processing for the stream in the fifth computation example by the confidential information processing device 200.

The processing flow in the fifth computation example is the same as the processing for the stream ID "1" except the number of successive payload is 2.

The stream 800 inputted from the external device 201 is inputted to the SHA 1 computation unit 252 via the stream control unit 220, the stream analysis unit 230 and the arbitration unit 240.

Since the number of successive payload is 2, the SHA 1 computation unit 252 considers the 256 bytes as one payload 801 which is the sum of the payload 1 which is the 128 bytes from the 33rd byte and the payload 2 which is the 128 bytes from the 289th byte out of the stream 800 which is a stream of 512 bytes. The SHA 1 computation unit 252 performs HMAC-SHA 1 computation for the 256 bytes payload 801.

The SHA 1 computation unit 252 saves the MAC value 802 which is the computation result to the context storage unit 211 as a is context. The MAC value 802 is stored as a hash value of the context with the context ID "10" included from the context storage table 213. With this, the external device 202 can read the MAC value 802 stored in the context storage table 213.

As described above, the confidential information processing device 200 can perform cryptographic computation for data in separate areas in the stream as one data.

From the above, the confidential information processing device 200 according to the present invention determines target data in different areas of the input stream by the stream analysis units 230, 231, 232 and 233 for each of the cryptographic computations when multiple cryptographic computations are performed for one input stream. With this, the target data for cryptographic computation included in an arbitrary area can be determined from the input stream with a simple software control even when the target data for cryptographic computation differs within the input stream in multiple cryptographic computations.

More specifically, by setting the content of the context correspondence table 212 from the external devices 201 and 202, a cryptographic computation with an arbitrary number and an arbitrary context for one stream can be set.

Furthermore, by including the stream analysis units 230, 231, 232 and 233, it is not necessary to switch save/restore of the context to/from the stream analysis units 230, 231, 232 and 233 when switching the first cryptographic computation and the second cryptographic computation. With this, the frequency of saving/restoring context can be reduced.

Likewise, the confidential information processing device 200 can determine the target data for cryptographic computation included in an arbitrary area in the input stream with a simple software control even when multiple streams are simultaneously inputted.

Furthermore, the stream in which the first cryptographic computation is performed is inputted to the stream analysis unit 230, 231, 232, or 233. With this, without outputting the stream to the external devices 201 and 202 whenever a cryptographic computation is completed, multiple cryptographic computations can be performed with one stream input.

Furthermore, it is possible to form arbitrary paths between the stream analysis units 230, 231, 232, 233 and the computation units 250, 251, and 252 by the arbitration unit 240. With this, multiple cryptographic computations using the same algorithm with one stream input (for example, encrypting after decrypting) can be performed. In the same manner, a cryptographic computation using the same algorithm can be performed for multiple streams.

Furthermore, in the confidential information processing device 200, the context storage unit 211 stores multiple contexts. In addition, the context control unit 210 saves and restores the context to be used for the cryptographic computation.

Thus, reading corresponding context from the context storage unit 211 facilitates the use of multiple computation methods. In addition, the computation units 250, 251 and 252 may include a register in which at least one context can be stored, the circuit scale of the computation units 250, 251 and 252 can be reduced. Furthermore, setting the contexts for multiple computation methods and storing the context to the context storage unit 211 facilitates, for example, change and addition of the computation methods.

Furthermore, the confidential information processing device 200 includes multiple computation units 250, 251, and 252 each of which corresponds to different cryptography algorithm. Thus, when multiple cryptographic computations using different streams are performed for one stream, each of the cryptographic computations can be performed by different computation units 250, 251 or 252. In the same manner, when multiple cryptographic computations using different streams are performed for multiple streams, each of the cryptographic computations can be performed by different computation units 250, 251 and 252.

With this, even when each of the computation units 250, 251 and 252 holds one context, it is not necessary to save and restore the context for every cryptographic computation. Thus the frequency of saving and restoring the context can be reduced. Therefore, the confidential information processing device 200 can perform cryptographic computation at high speed.

Furthermore, the confidential information processing device 200 stores a hash value and a MAC value which are computation results in the context storage unit 211. With this, the external devices 201 and 202 can read the hash value and the MAC value which are computation results.

Furthermore, the confidential information processing device 200 outputs the input stream to the external device 201 or other stream analysis units 230, 231, 232 and 233 even when authentication processing using the hash computation and the secret key cryptography algorithm is performed. With this, the stream can be processed in the same manner when encryption and decryption is performed.

Furthermore, the confidential information processing device 200 stores fraction payload in the context storage unit 211. With this, even when the target data of the input data is not integral multiple of the unit of computation, the fraction payload can be processed in the confidential information processing device 200 without outputting the fraction payload to the external devices 201 and 202.

Furthermore, the confidential information processing device 200 stores the context including the number of successive payloads in the context storage unit 211. With this, the confidential information processing device 200 can perform cryptographic computation for data in separate areas in the stream as one data.

Furthermore, the confidential information processing device 200 stores the context including the hash value replacement position in the context storage unit 211. With this, the confidential information processing device 200 can incorporate a hash value and a MAC value which are computation results to an arbitrary position of the stream.

Furthermore, the confidential information processing device 200 stores the context including the hash value comparison position in the context storage unit 211. With this, the confidential information processing device 200 can incorporate a hash value and a MAC value which are computation results into an arbitrary position of the stream.

Furthermore, the confidential information processing device 200 stores the context including the fraction output flag, the number of successive payloads, the stream non-output flag, the hash value replacement position and the hash value comparison position in the context storage unit 211. With this, by setting the context stored in the context storage unit 211, it is possible to perform multiple cryptographic computations.

As described above, the confidential information processing device 200 according to the present invention can easily perform multiple cryptographic computation using non-unique computation methods and can facilitate the control by a software. In addition, the confidential information processing device 200 according to the present invention can facilitate the control by the software even when cryptographic computations using multiple computation methods are performed.

The confidential information processing device according to the embodiment of the present invention is described above, however, the present invention is not limited to the embodiment.

For example, the example in which the confidential information processing device 200 includes three computation units 250, 251 and 252 are described, however, the number of the computation units are not limited to three. For example, the confidential information processing device 200 may only include a computation unit in compliance with the secret key cryptography algorithm, or a computation unit in compliance with the hash algorithm. In addition, the confidential information processing device 200 may include two or more than four computation units.

In addition, in the description above, the cryptographic algorithms in the computation unit are AES, DES, and SHA, however, the cryptographic algorithms may also be Multi2, Camellia, MD5 (Message Digest 5) and other cryptographic algorithms.

In addition, the mode of the cryptographic computation performed in each of the computation units may be any mode such as CBC, ECB (Electronic Codebook), XCBC-MAC, OFB (Output Feedback), and CTR (Counter).

In addition, in the description above, the confidential information processing device 200 includes two stream control units 220 and 221, one or more stream control unit may be included.

In addition, in the description above, the confidential information processing device 200 includes two stream analysis units for each of two stream control units 220 and 221, however, one or more than three stream analysis units may be included for each of the stream control units 220 and 221. Furthermore, in this case, in the context correspondence table 212, three or more context IDs corresponding to one stream ID may be set. With this, three or more cryptographic computations can be performed for one stream.

In addition, the confidential information processing device 200 may include different number of stream analysis units for each of the stream control units 220 and 221.

In addition, in the description above, the context storage unit 211 stores the context correspondence table 212, the stream control units 220 and 221 may store the context correspondence table 212.

In addition, with the description above, the AES computation unit 250 and the DES computation unit 251 perform encryption and decryption, however, either one of encryption or decryption may be performed.

In addition, in the description above, seven stream IDs are stored in the context correspondence table 212, however, any number of stream ID may be stored. In addition, in the description above, eleven context IDs are stored in the context correspondence table 213, however, any number of stream ID may be stored.

In addition, in the description above, save and restore of the fraction payload when the fraction output flag is off, extraction of the target data for computation based on the number of successive payloads, replacement of the hash value and the MAC value based on the hash value replacement position, and comparison of the hash value or the MAC value based on the hash value comparison position are performed in the computation units 250, 251 and 252, however, one or more of the processing above may be performed in the stream analysis units 230, 231, 232 and 233.

Furthermore, in the description above, the stream analysis units 230, 231, 232, and 233 outputs the information for specifying the target data to the computation units 250, 251 and 252 via the arbitration unit 240, however, only the target data may be outputted to the computation units 250, 251 and 252.

In addition, in the description above, the computation units 250, 251 and 252 store the generated MAC value, the hash value and the fraction payload in the context storage unit 211, however, the computation units 250, 251 and 252 may hold a MAC value and a hash value, fraction payload generated as the contexts 260, 261 and 262. In this case, when saving the context, the MAC value and the hash value, and the fraction payload are saved in the context storage unit 211.

In addition, in the description above, the context control unit 210, the stream control units 220 and 221, the stream analysis units 230, 231, 232 and 233, the arbitration unit 240, the AES computation unit 250, the DES computation unit 251 and the SHA 1 computation unit 252 are configured by the proprietary circuits (hardware). However, a part of the function implemented by the processing units may be implemented by executing a program by the CPU and the like (software).

In addition, in the description above, the configuration shown in FIG. 5 is described as the configuration of the stream control units 220 and 221, the configurations for the stream control units 220 and 221 may not be limited to the description.

Figure 15:
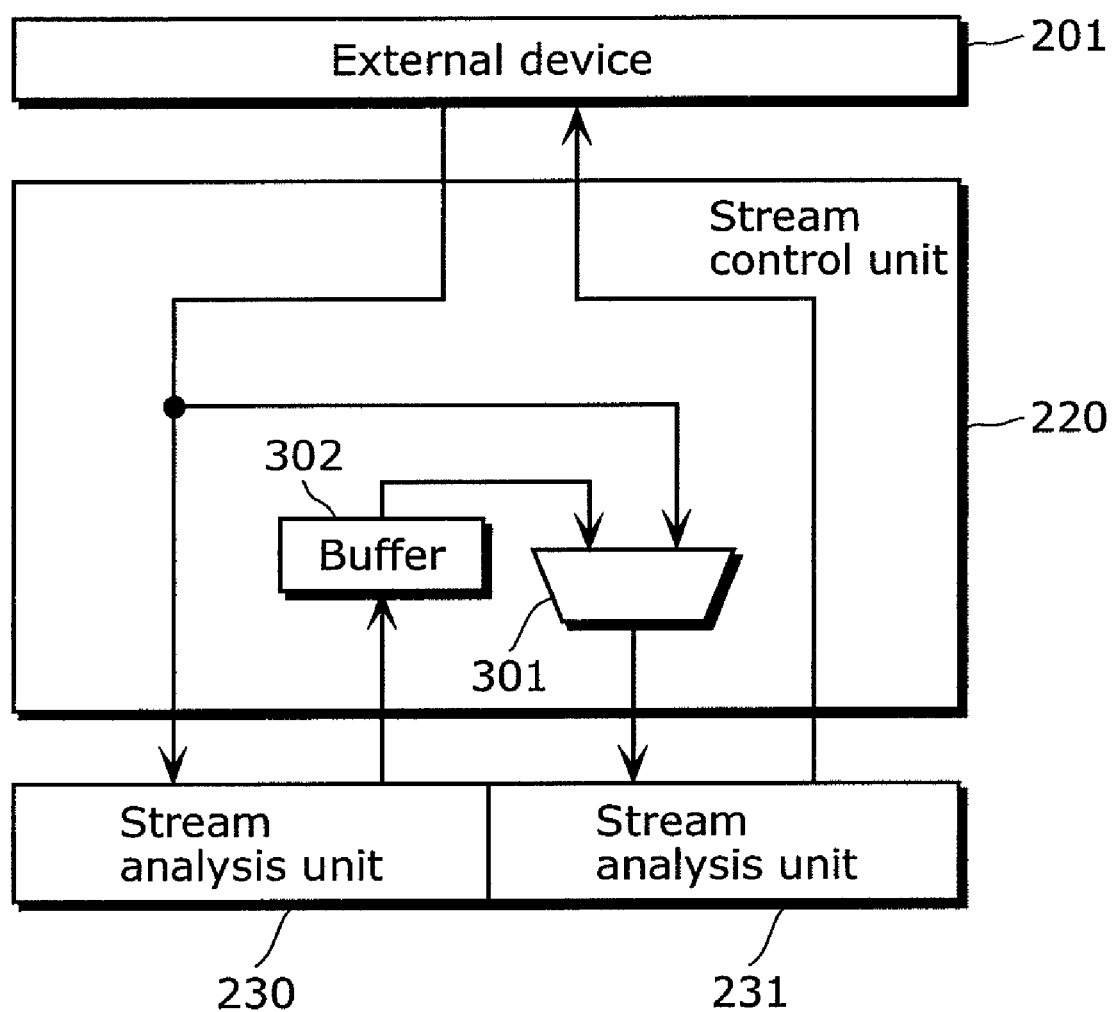
FIG. 15 shows a block diagram of variation configuration of the stream control unit according to the embodiment of the present invention.

FIG. 15 shows the variation configuration of the stream control units 220 and 221. The stream control unit 220 shown in FIG. 15 outputs the input stream inputted from the external device 201 to the stream analysis unit 230 or 231. In addition, the stream control unit 220 outputs the output stream outputted from the stream analysis unit 230 to the stream analysis unit 231 via the buffer 302, and outputs the output stream outputted from the stream analysis unit 231 to the external device 201.

Furthermore, the stream control unit 220 may have a configuration in which the external device 201, the stream analysis unit 230 and the stream analysis unit 231 can be connected by any combination of the paths in between. The stream control unit 220 selectively outputs the input stream inputted from the external device 201 to the stream analysis unit 230 or 231, and selectively outputs the output streams outputted from the stream analysis units 230 and 231 to the external device 201 or other stream analysis unit 230 or 231, respectively.

In addition, in the description above, an example in which the confidential information processing device 200 is applied to a mobile phone apparatus, however, the confidential information processing device may also be applied to a digital television, an STB, a DVD recorder, a DVD player, an HD recorder, a PC, and a Personal Digital Assistant (PDA) and others.

Figure 16:
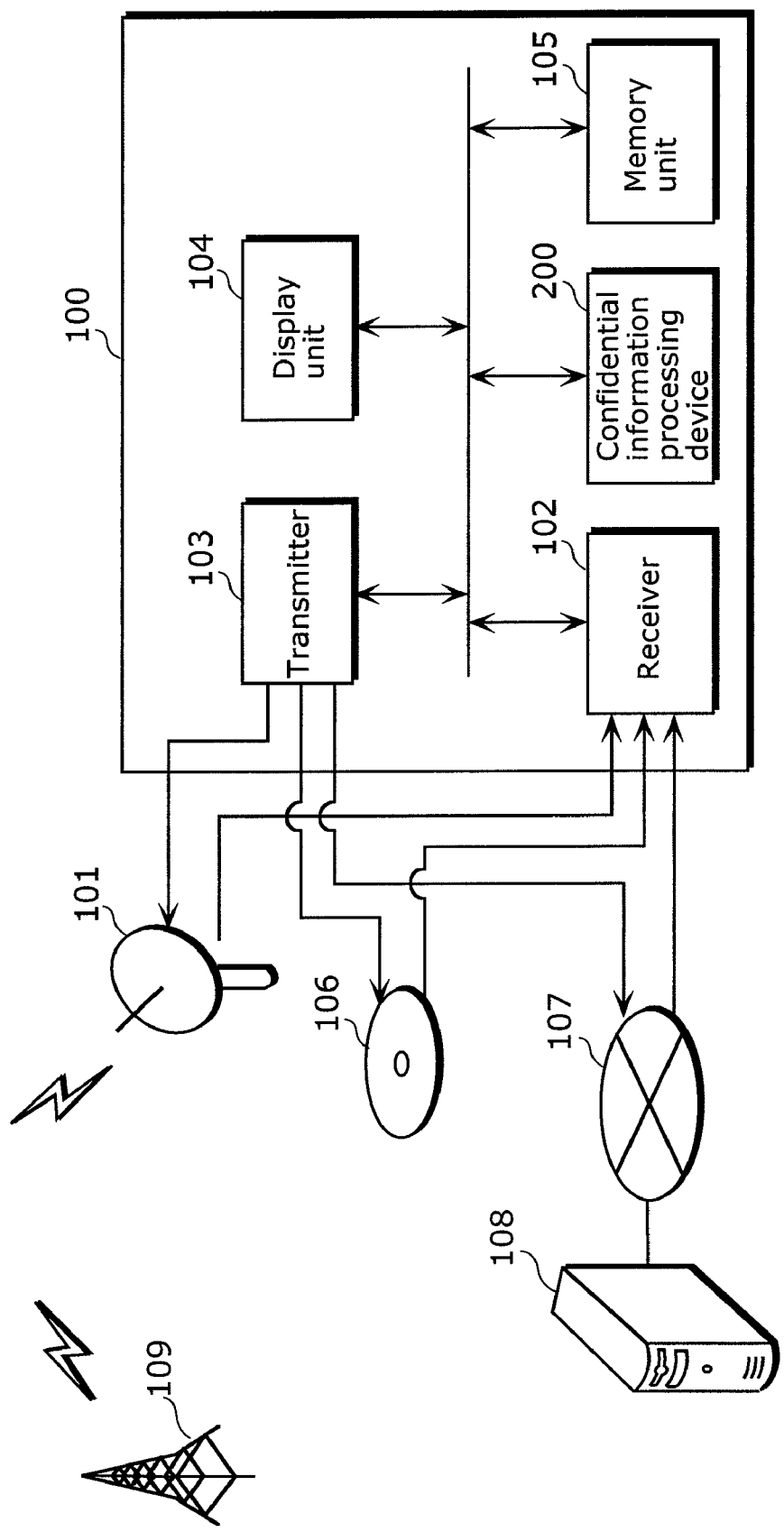
FIG. 16 shows a block diagram of the variation configuration of confidential information processing apparatus according to the embodiment of the present invention.

FIG. 16 shows a the variation configuration of confidential information processing apparatus 100 according to the embodiment of the present invention. As shown in FIG. 16, the confidential information processing device 100 may decrypt the encrypted data transmitted via, for example, the digital broadcasting from the external apparatus 109, and may display the data on the display 104. In addition, the confidential information processing apparatus 100 may decrypt the encrypted data stored in the recording medium (such as a CD, a DVD, a memory card and a USB memory) 106. In addition, the confidential information processing apparatus 100 may store the data encrypted by the confidential information processing device 200 in the recording medium 106. In addition, the confidential information processing apparatus 100 may decrypt the encrypted data transmitted from the external apparatus 108 via the network 107. Furthermore, the confidential information processing apparatus 100 may transmit the data encrypted by the confidential information processing device 200 to the external apparatus 108 via the network 107.

Although only some exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be applied to a confidential information processing device, more particularly, to a confidential information processing device connected to the network which requires encrypted communication, and to a confidential information processing apparatus which processes copyrighted streams. For example, the present invention can be applied to a mobile phone device, a digital television, an STB, a DVD recorder, a DVD player, an HD recorder, a personal computer and a PDA and others.

What is claimed is:

1. A confidential information processing device which performs a plurality of cryptographic computations on different target data included in a data stream inputted from an external device, said confidential information processing device comprising:

at least one stream analyzer operable to determine the target data by analyzing the data stream;

at least one cryptographic computer operable to hold a context including at least one of a key used for the cryptographic computation, an initial value, and intermediate information during cryptographic computation, and perform the cryptographic computation using the context that is being held;

a context storage operable to store a plurality of the contexts;

a correspondence table storage operable to store a correspondence table which indicates the number of cryptographic computations to be performed for the data stream and a context to be used for each of the cryptographic computations;

a context controller operable to, when the context held in said cryptographic computer does not match the context to be used indicated in the correspondence table, save the context held in said cryptographic computer to the context storage and restore the context to be used for the cryptographic computation indicated in the correspondence table out of the plurality of contexts stored in said context storage to said cryptographic computer; and a stream controller operable to output the data stream on which the cryptographic computation is performed by said cryptographic computer to the external device, when the number of the cryptographic computations matches the number indicated in the correspondence table, and to output the data stream on which the cryptographic computation is performed by said cryptographic computer to said stream analyzer, when the number of the cryptographic computation does not match the number of cryptographic computations indicated in the correspondence table.

2. The confidential information processing device according to claim 1, wherein said at least one of stream analyzer includes a first stream analyzer and a second stream analyzer each of which is operable to determine the target data by analyzing the data stream, and said stream controller is operable to output the data stream to said first stream analyzer and to output the data stream on which the first cryptographic computation is performed by said cryptographic computer to said second stream analyzer when the correspondence table indicates that two or more cryptographic computations are performed.

3. The confidential information processing device according to claim 2, further comprising an arbitrator operable to select one of the data streams out of the data streams in which the target data is judged by the first stream analyzer and the second stream analyzer, wherein said cryptographic computer performs cryptographic computation for the target data included in the data stream outputted from the arbitrator using the context being held.

4. The confidential information processing device according to claim 1, wherein said at least one of cryptographic computer includes:

a first computer operable to perform a cryptographic computation for the target data using a first cryptographic algorithm; and a second computer operable to perform a cryptographic computation for the target data using a second cryptographic algorithm which is different from the first cryptographic algorithm, and the first computer and the second computer respectively hold at least one of the contexts.

5. The confidential information processing device according to claim 1, wherein at least one of the cryptographic computers includes a hash computer operable to generate a hash value by performing a hash computation for the target data, the context includes the hash value generated by the hash computer, the stream controller is operable to output the data stream on which the hash computation is performed by the hash computer to said external device or said stream analyzer in the same state as the data stream is originally inputted from the external device.

6. The confidential information processing device according to claim 1, wherein at least one of said cryptographic computers includes a hash computer operable to generate a hash value by performing a hash computation for the target data, the context includes hash value replacement position information which indicates a predetermined position of data included in the data stream, the hash computer is operable to replace the data at the predetermined position indicated by the hash value replacement position information corresponding to the data stream with the hash value, said stream controller is operable to output the data stream in which the data at the predetermined position is replaced with the hash value by the hash computer to said external device or said stream analyzer.

7. The confidential information processing device according to claim 1, wherein at least one of said cryptographic computers includes a hash computer operable to generate a hash value by performing a hash computation for the target data, the context includes hash value comparison position information which indicates a predetermined position of the data included in the data stream, and said hash computer is operable to judge whether or not the data at the predetermined position indicated in the hash value comparison information corresponding to the data stream matches the hash value.

8. The confidential information processing device according to claim 1, wherein at least one of said cryptographic computers includes a secret key cryptography computer unit operable to generate a message authentication code by performing a computation in an authentication mode for the target data using the secret key cryptography algorithm, the context includes the message authentication code generated by the secret key cryptography computer, said stream controller is operable to output the data stream on which the secret key cryptography computer has performed a computation in the authentication mode to the external device or the stream analysis unit in the same state in which the data stream is originally inputted from the external device.

9. The confidential information processing device according to claim 1, wherein at least one of said cryptographic computers includes a secret key cryptography computer operable to generate a message authentication code by performing a computation in an authentication mode for the target data using the secret key cryptography algorithm, the context includes message authentication code replacement position information which indicates a predetermined position of the data included in the data stream, said secret key cryptography computer is operable to replace the data at the predetermined position indicated by the message authentication code replacement position information with the message authentication code, and said stream controller is operable to output the data stream in which the data at the predetermined position is replaced with the message authentication code by said secret key cryptography computer to said external device or said stream analyzer.

10. The confidential information processing device according to claim 1, wherein at least one of said cryptographic computers includes a secret key cryptography computer operable to generate a message authentication code by performing a computation in an authentication mode for the target data using the secret key cryptography algorithm, the context includes message authentication code comparison position information which indicates a predetermined position of the data included in the data stream, said secret key cryptography computer judges whether or not the data at the predetermined position indicated by the message authentication comparison information corresponding to the data stream matches the message authentication code.

11. The confidential information processing device according to claim 1, wherein the context includes fraction data which is a target data that does not match the unit of computation for the cryptographic computation when the data amount of the target data is not an integral multiple of the unit of computation, and said cryptographic computer is operable to perform the cryptographic computation for the target data including the fraction data in the context when performing the cryptographic computation for a subsequent data stream.

12. The confidential information processing device according to claim 1, wherein the context includes successive processing information which indicates a plurality of separate areas in the data stream, and said cryptographic computer is operable to perform cryptographic computation for the data in the separate areas indicated in the successive processing information as one data.

13. The confidential information processing device according to claim 1, wherein the context includes area information which indicates an area where cryptographic computation is performed in the data included in the data stream, and said stream analyzer is operable to determine the target data in the area indicated by the area information.

14. The confidential information processing device according to claim 1, wherein said stream controller includes a buffer which holds a data stream on which cryptographic computation is performed by said cryptographic computer and outputs the data stream that is being held to said stream analysis unit.

15. The confidential information processing device according to claim 1, wherein at least one of said cryptographic computer includes a secret key cryptography computer operable to perform a secret key cryptography computation, and a hash computer operable to perform the hash computation for the target data.

16. A confidential information processing apparatus which performs a plurality of cryptographic computations on different target data included in a data stream inputted from an external device, said confidential information processing apparatus comprising:

a receiver operable to receive the data stream transmitted from an external apparatus, at least one stream analyzer operable to determine the target data by analyzing the data stream;

at least one cryptographic computer operable to hold a context including at least one of a key used for the cryptographic computation, an initial value, and intermediate information during cryptographic computation, and perform the cryptographic computation using the context that is being held;

a context storage operable to store a plurality of the contexts;

a correspondence table storage operable to store a correspondence table which indicates the number of cryptographic computations to be performed for the data stream and a context to be used for each of the cryptographic computations;

a context controller operable to, when the context held in said cryptographic computer does not match the context to be used indicated in the correspondence table, save the context held in said cryptographic computer to the context storage and restore the context to be used for the cryptographic computation indicated in the correspondence table out of the plurality of contexts stored in said context storage to said cryptographic computer;

a display operable to reproduce and display the data stream; and a stream controller operable to output the data stream on which the cryptographic computation is performed by said cryptographic computer to the external device, when the number of the cryptographic computations matches the number indicated in the correspondence table, and to output the data stream on which the cryptographic computation is performed by said cryptographic computer to said stream analyzer, when the number of the cryptographic computation does not match the number of cryptographic computations indicated in the correspondence table.

17. A confidential information processing apparatus which performs a plurality of cryptographic computations on different target data included in a data stream inputted from an external device, said confidential information processing device comprising:

at least one stream analyzer operable to determine the target data by analyzing the data stream;

at least one cryptographic computer operable to hold a context including at least one of a key used for the cryptographic computation, an initial value, and intermediate information during cryptographic computation, and perform the cryptographic computation using the context that is being held;

a context storage operable to store a plurality of the contexts;

a correspondence table storage operable to store a correspondence table which indicates the number of cryptographic computations to be performed for the data stream and a context to be used for each of the cryptographic computations;
a context controller operable to, when the context held in said cryptographic computer does not match the context to be used indicated in the correspondence table, save the context held in said cryptographic computer to the context storage and restore the context to be used for the cryptographic computation indicated in the correspondence table out of the plurality of contexts stored in said context storage to said cryptographic computer;
a transmitter operable to transmit the data stream to an external apparatus; and
a stream controller operable to output the data stream on which the cryptographic computation is performed by said cryptographic computer to the external device, when the number of the cryptographic computations matches the number indicated in the correspondence table, and to output the data stream on which the cryptographic computation is performed by said cryptographic computer to said stream analyzer, when the number of the cryptographic computation does not match the number of cryptographic computations indicated in the correspondence table.

18. A confidential information processing method in a confidential information processing device which performs a plurality of cryptographic computations on different target data included in a first data stream inputted from an external device, said confidential information processing device including:
  at least one stream analyzer operable to determine the target data by analyzing the first data stream;
  at least one cryptographic computer operable to hold a context including at least one of a key used for the cryptographic computation, an initial value, and intermediate information during cryptographic computation, and perform the cryptographic computation using the context that is being held;
  a context storage operable to store a plurality of the contexts;
  a correspondence table storage operable to store a correspondence table which indicates the number of cryptographic computations to be performed for the first data stream and a context to be used for each of the cryptographic computations;
  a context controller operable to, when the context held in said cryptographic computation unit does not match the context to be used indicated in the correspondence table, save the context held in said cryptographic computer to the context storage and restore the context to be used for the cryptographic computation indicated in the correspondence table out of the plurality of contexts stored in said context storage to said cryptographic computer; and
  a stream controller operable to output the first data stream on which the cryptographic computation is performed by said cryptographic computer to the external device or the stream analyzer, and
said confidential information processing method comprising:
determining the first target data out of the first data stream in the stream analyzer;
generating a second data stream by performing a cryptographic computation on the first target data included in the first data stream in the cryptographic computer;
outputting, by the stream controller, the second data stream to the stream analyzer;
determining a second target data out of the second data stream in the stream analyzer; and
generating a third data stream by performing cryptographic computation on the second target data included in the second data stream,
when the correspondence table indicates two or more cryptographic computations are performed on the first data stream.

* * * * *